US009158985B2

United States Patent
Li et al.

(10) Patent No.: US 9,158,985 B2
(45) Date of Patent: Oct. 13, 2015

(54) METHOD AND APPARATUS FOR PROCESSING IMAGE OF SCENE OF INTEREST

(71) Applicant: Xerox Corporation, Norwalk, CT (US)

(72) Inventors: Qun Li, Webster, NY (US); Edgar A. Bernal, Webster, NY (US); Aaron Michael Burry, Ontario, NY (US); Peter Paul, Webster, NY (US); Robert P. Loce, Webster, NY (US)

(73) Assignee: XEROX CORPORATION, Norwalk, CT (US)

( * ) Notice: Subject to any disclaimer, the term of this patent is extended or adjusted under 35 U.S.C. 154(b) by 64 days.

(21) Appl. No.: 14/195,036

(22) Filed: Mar. 3, 2014

(65) Prior Publication Data
US 2015/0248590 A1  Sep. 3, 2015

(51) Int. Cl.
G06K 9/00     (2006.01)
G06K 9/32     (2006.01)
G06T 7/00     (2006.01)

(52) U.S. Cl.
CPC .......... G06K 9/3241 (2013.01); G06K 9/00711 (2013.01); G06T 7/0081 (2013.01); G06T 7/0097 (2013.01); G06K 2209/21 (2013.01); G06T 2207/10016 (2013.01)

(58) Field of Classification Search
CPC .................................................... G06K 9/3241
USPC ......................................................... 382/103
See application file for complete search history.

(56) References Cited

U.S. PATENT DOCUMENTS 6,661,918 B1 * 12/2003 Gordon et al. ................ 382/173
2009/0003725 A1 *  1/2009 Merkel et al. ................. 382/274

OTHER PUBLICATIONS

Koller et al., Robust Multiple Car Tracking with Occlusion Reasoning, California PATH Program, Institute of Transportation Studies, University of California at Berkeley, 1994, 27 pp.
McKenna et al., Tracking Groups of People, Computer Vision and Image Understanding, vol. 80, Issue 1, Oct. 2000, pp. 42-56.
Elgammal et al., Background and Foreground Modeling Using Nonparametric Kernel Density Estimation for Visual Surveillance, Proceedings of the IEEE, vol. 90, Issue 7, Jul. 2002, pp. 1151-1163.
Cucchiara et al., Detecting Moving Objects, Ghosts, and Shadows in video streams, IEEE Transactions on Pattern Analysis and Machine Intelligence, vol. 25, Issue 10, Oct. 2003, pp. 1337-1342.
(Continued)

*Primary Examiner* — Gregory F Cunningham
(74) *Attorney, Agent, or Firm* — Fay Sharpe LLP

(57) ABSTRACT

A method for processing an image of a scene of interest includes receiving an original target image of a scene of interest at an image processing device from an image source device, the original target image exhibiting shadowing effects associated with the scene of interest when the original target image was captured, the original target image comprising a plurality of elements and representing an instantaneous state for the scene of interest, pre-processing the original target image using a modification identification algorithm to identify elements of the original target image to be modified, and generating a copy mask with a mask region representing the elements to be modified and a non-mask region representing other elements of the original target image. An image processing device for processing an image of a scene of interest and a non-transitory computer-readable medium are also provided.

20 Claims, 20 Drawing Sheets

(56) References Cited

OTHER PUBLICATIONS

Cucchiara et al., Detecting Objects, Shadows, and Ghosts in Video Streams by Exploiting Color and Motion Information, Proceedings of 11th International Conference on Image Analysis and Processing, Sep. 26, 2001, pp. 360-365.

Stauffer et al., Adaptive Background Mixture Models for Real-time Tracking, IEEE Computer Society Conference on Computer Vision and Pattern Recognition, vol. 2, Jun. 23, 1999, pp. 246-252.

500+ Named Colours with rgb and hex values, cloford.com, printed from http://cloford.com/resources/colours/500col.htm on Dec. 5, 2013, Copyright 2000-2011, 13 pp.

Zivkovic, Improved Adaptive Gaussian Mixture Model for Background Subtraction, Proceedings of the 17th International Conference on Pattern Recognition, vol. 2, Aug. 23, 2004, pp. 28-31.

Prati et al., Detecting Moving Shadows: Algorithms and Evaluation, IEEE Transactions on Pattern Analysis and Machine Intelligence, vol. 25, No. 7, Jul. 2003, pp. 918-923.

Smith et al., Evaluating Multi-Object Tracking, IEEE Computer Society Conference on Computer Vision and Pattern Recognition—Workshop on Empirical Evaluation Methods in Computer Vision (EEMCV), Jun. 2005, 7 pp.

\* cited by examiner

| white | silver | gray | black |
| #FFFFFF | #C0C0C0 | #808080 | #000000 |
| rgb (255,255,255) | rgb (192,192,192) | rgb (128,128,128) | rgb (0,0,0) |
| yellow | fuchsia | red | maroon |
| #FFFF00 | #FF00FF | #FF0000 | #800000 |
| rgb (255,255,0) | rgb (255,0,255) | rgb (255,0,0) | rgb (128,0,0) |
| lime | olive | green | purple |
| #00FF00 | #808000 | #008000 | #800080 |
| rgb (0,255,0) | rgb (128,128,0) | rgb (0,128,0) | rgb (128,0,128) |
| aqua | teal | blue | navy |
| #00FFFF | #008080 | #0000FF | #000080 |
| rgb (0,255,255) | rgb (0,128,128) | rgb (0,0,255) | rgb (0,0,128) |

FIG. 3

|  | R | G | B |
|---|---|---|---|
| BROWN | 244 | 164 | 96 |
| BLACK | 0 | 0 | 0 |
| BLUE | 0 | 0 | 255 |
| LIGHT BLUE | 173 | 216 | 270 |
| GREY | 128 | 128 | 128 |
| NAVY | 0 | 0 | 96 |

METHOD AND APPARATUS FOR PROCESSING IMAGE OF SCENE OF INTEREST

BACKGROUND

The present exemplary embodiment generally relates to processing a target image using a background model corresponding to the scene depicted by the target image. The exemplary embodiment finds particular application in identifying shadow portions in the target image. A preprocessing step performed prior to foreground estimation via background subtraction modifies the target image or the background estimate according to a modification identification algorithm. The modified images are such that shadow portions won't be detected as foreground after background subtraction is performed.

Video-based detection of moving and foreground objects is typically a prerequisite of video-based object tracking. Foreground objects are moving and stationary non-permanent objects in a scene, where non-permanent is relative to general understanding of a constant state. For instance, moving people in a scene are foreground objects. Another example is luggage left in a terminal, which, while static over possibly multiple frames of video, is not part of the general understanding of the constant state of the terminal, and thus are also foreground objects. "Background" is the stationary content in a scene relative to general understanding of constant state. Some variability in time can be included in the definition of background. For instance, camera shake and swaying trees have dynamic effects on acquired images, but these effects are typically included in the background.

One of the problems in computer vision applications, such as surveillance, traffic monitoring, patient care, etc., is detection of foreground objects, particularly moving and stationary non-permanent objects, in a manner that is sufficiently reliable that also makes efficient use of resources. Examples of scenarios that rely on object detection and tracking include video-based vehicle speed estimation, automated parking monitoring, tracking people, and measuring total experience time in retail spaces. A key challenge associated with moving object detection is identifying shadows casted by the objects and moving along with them across the scene. Shadows may cause problems when segmenting and extracting foreground objects due to the potential misclassification of shadow pixels as foreground pixels. Although shadow detection algorithms have been widely explored in the literature, most existing work makes limiting assumptions about the scene, requires a number of key parameters to be fine-tuned based on the particulars of the specific application, and considers shadow detection as a separate step from background subtraction. The limiting assumptions are a barrier to broad deployment. Furthermore, the typical processes result in computational complexity that grows as the number of originally detected foreground pixels increases, which is usually the case in high vehicular or pedestrian traffic conditions.

In applications that perform analytics from video captured using fixed cameras (e.g., stationary surveillance cameras), the two most commonly used methods of foreground and motion detection are frame-to-frame differencing (strictly for motion detection) and background estimation and subtraction (for foreground and motion detection). The frame differencing method typically requires tuning to a very narrow range of object speed relative to the frame rate and camera geometry. On the other hand, background estimation and subtraction is more flexible in terms of adjustment of the time scale and dynamically adjusting parameters in the background modeling. Strictly speaking, a background subtraction method detects foreground objects rather than moving objects; however, moving objects will trigger foreground detection as their appearance differs from the appearance of the background estimate. In other words, moving objects are also considered foreground objects. This is in contrast with frame-differencing methods, which are only capable of moving object detection.

Background subtraction segments the foreground by comparing or subtracting the estimated background image from the current video frame. Significant differences in the resulting difference image usually correspond to foreground objects. Strategies used to maintain a background model or estimate include running averages, Gaussian mixture models, median filtering, etc. A background model is a mathematical or algorithmic framework used to estimate the background of a scene at a given time. This estimate of the background can be referred to synonymously as the background estimate or the background model because, in addition as a means to estimate, the mathematical/algorithmic is an alternative representation of the estimate.

Ideally, background subtraction should detect real foreground objects with high accuracy, limiting false negatives as much as possible; at the same time, it should extract pixels of foreground objects with the maximum responsiveness possible, avoiding detection of spurious objects, such as cast shadows, or noise. One of the main challenges associated with foreground or moving object detection is identifying shadows casted by objects and moving along with them across the scene. Shadows can pose serious challenges when segmenting and extracting moving objects due to the potential misclassification of shadow pixels as foreground pixels. The difficulties associated with shadow detection arise since shadows and objects share two important visual features. First, shadow points are detectable as foreground points since they typically differ significantly from the background. Second, shadows have similar patterns of motion as the objects casting them. Shadows can be especially problematic when they touch other moving objects in the scene, thereby making it difficult to identify distinct moving objects. For the above reasons, shadow identification has become an active research area.

Shadow detection algorithms have been widely explored in the literature. For additional information on shadow detection algorithms, see, e.g., Prati et al., Detecting Moving Shadows: Algorithms and Evaluation, IEEE Transactions on Pattern Analysis and Machine Intelligence, Vol. 25, No. 7, July 2003, pp. 918-923. Existing approaches (deterministic or statistical, model- or non-model-based in terms of the decision process) exploit a large set of assumptions to limit complexity and to avoid being unduly constrained to a specific scene model. These existing approaches rely on carefully selected parameters either in the shadow model or the decision threshold. This limits their shadow detection accuracy as well as extendibility.

Moreover, the existing work considers shadow detection separate from background subtraction. Specifically, traditional background subtraction methods extract a foreground that includes both real moving objects and shadows and then apply a shadow detection criterion on the detected foreground area to remove shadow pixels that were extracted as foreground pixels during the background subtraction. The computational complexity of this approach grows as the number of (originally) detected foreground pixels increases (which is usually the case in scenes with high vehicular or pedestrian traffic).

INCORPORATION BY REFERENCE

The following documents are fully incorporated herein by reference: 1) Koller et al., Robust Multiple Car Tracking with Occlusion Reasoning, California PATH Program, Institute of Transportation Studies, University of California at Berkeley, 1994, 27 pp.; 2) McKenna et al., Tracking Groups of People, Computer Vision and Image Understanding, Vol. 80, Issue 1, October 2000, pp. 42-56; 3) Elgammal et al., Background and Foreground Modeling Using Nonparametric Kernel Density Estimation for Visual Surveillance, Proceedings of the IEEE, Vol. 90, Issue 7, July 2002, pp. 1151-1163; 4) Cucchiara et al., Detecting Moving Objects, Ghosts, and Shadows in video streams," IEEE Transactions on Pattern Analysis and Machine Intelligence, Vol. 25, Issue 10, October 2003, pp 1337-1342; 5) Cucchiara et al., Detecting Objects, Shadows, and Ghosts in Video Streams by Exploiting Color and Motion Information, Proceedings of 11$^{th}$ International Conference on Image Analysis and Processing, Sep. 26, 2001, pp. 360-365; 6) Stauffer et al., Adaptive Background Mixture Models for Real-time Tracking, IEEE Computer Society Conference on Computer Vision and Pattern Recognition, Vol. 2, Jun. 23, 1999, pp. 246-252; 7) 500+ Named Colours with rgb and hex values, cloford.com, printed from http://cloford.com/resources/colours/500col.htm on Dec. 5, 2013, Copyright 2000-2011, 13 pp.; 8) Zivkovic, Improved Adaptive Gaussian Mixture Model for Background Subtraction, Proceedings of the 17$^{th}$ International Conference on Pattern Recognition, Vol. 2, Aug. 23, 2004, pp. 28-31; 9) Prati et al., Detecting Moving Shadows: Algorithms and Evaluation, IEEE Transactions on Pattern Analysis and Machine Intelligence, Vol. 25, No. 7, July 2003, pp. 918-923; and 10) Smith et al., Evaluating Multi-Object Tracking, IEEE Computer Society Conference on Computer Vision and Pattern Recognition—Workshop on Empirical Evaluation Methods in Computer Vision (EEMCV), June 2005, 7 pp.

BRIEF DESCRIPTION

In one aspect, a method for processing an image of a scene of interest is provided. In one embodiment, the method includes: receiving an original target image of a scene of interest at an image processing device from an image source device, the original target image exhibiting shadowing effects associated with the scene of interest when the original target image was captured, the original target image comprising a plurality of elements and representing an instantaneous state for the scene of interest; pre-processing the original target image using a modification identification algorithm to identify elements of the original target image to be modified; generating a copy mask with one or more mask regions representing the elements to be modified and one or more non-mask regions representing other elements of the original target image; receiving a baseline background model of the scene of interest at the image processing device from a storage device, the baseline background model comprising a plurality of elements and representing a baseline state for the scene of interest; processing the original target image in conjunction with the copy mask and the baseline background model; and using a foreground detection algorithm to identify elements of the original target image that exhibit attributes of a foreground without shadows.

In another aspect, an apparatus for processing an image of a scene of interest is provided. In one embodiment, the apparatus includes: a target image communication interface configured to receive an original target image of a scene of interest from an image source device, the original target image exhibiting shadowing effects associated with the scene of interest when the original target image was captured, the original target image comprising a plurality of elements and representing an instantaneous state for the scene of interest; a shadow processor configured to pre-process the original target image using a modification identification algorithm to identify elements of the original target image to be modified, wherein the shadow processor is configured to generate a copy mask with one or more mask regions representing the elements to be modified and one or more non-mask regions representing other elements of the original target image; a background modeling interface configured to either receive a baseline background model of the scene of interest from a storage device, the baseline background model comprising a plurality of elements and representing a baseline state for the scene of interest; and a foreground processor configured to process the original target image in conjunction with the copy mask and the baseline background model, wherein the foreground processor is configured to use a foreground detection algorithm to identify elements of the original target image that exhibit attributes of a foreground without shadows.

In yet another aspect, a non-transitory computer-readable medium is provided. In one embodiment, the non-transitory computer-readable medium storing program instructions that, when executed by one or more processors, cause a corresponding image processing device to perform a method for processing an image of a scene of interest. In one embodiment, the method includes: receiving an original target image of a scene of interest at an image processing device from an image source device, the original target image exhibiting shadowing effects associated with the scene of interest when the original target image was captured, the original target image comprising a plurality of elements and representing an instantaneous state for the scene of interest; pre-processing the original target image using a modification identification algorithm to identify elements of the original target image to be modified; generating a copy mask with one or more mask regions representing the elements to be modified and one or more non-mask regions representing other elements of the original target image; receiving a baseline background model of the scene of interest at the image processing device from a storage device, the baseline background model comprising a plurality of elements and representing a baseline state for the scene of interest; processing the original target image in conjunction with the copy mask and the baseline background model; using a foreground detection algorithm to identify elements of the original target image that exhibit attributes of a foreground without shadows; and generating a target foreground mask with one or more foreground regions representing the elements exhibiting foreground attributes without shadows.

BRIEF DESCRIPTION OF THE DRAWINGS

FIG. 3 is a tabular grid showing RGB values for some common colors;

DETAILED DESCRIPTION

Figure 1:
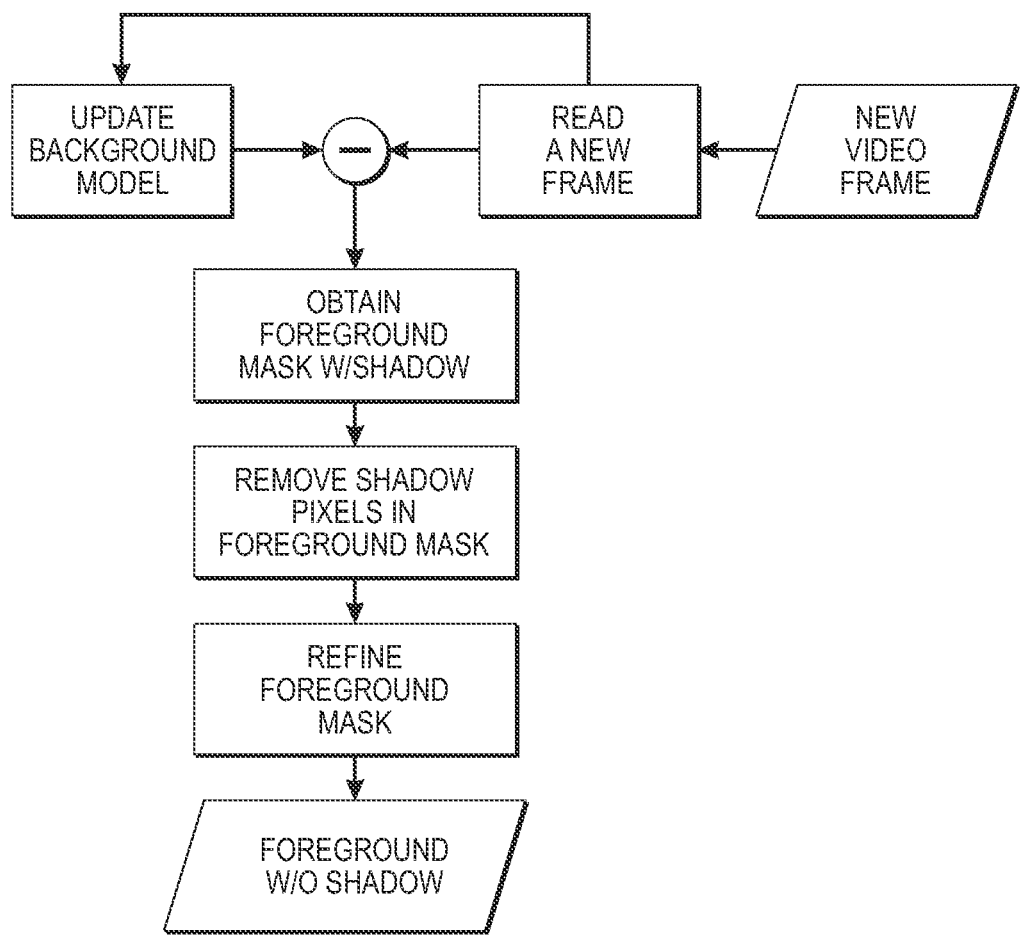
FIG. 1 is a flow chart of an exemplary embodiment of an existing process that uses a background subtraction method with shadow removal to process an image.

The various embodiments disclosed herein generally relate to processing a target image using a background model corresponding to the scene depicted by the target image. The exemplary embodiment finds particular application in identifying shadow portions in the target image. The shadow portions may either be removed from the target image or added to the background model so that comparison of the target image and background model can be used to generate a foreground mask in which the foreground portion of the target image does not include the shadow portion. It is to be appreciated that the exemplary embodiments described herein are also amenable to other applications in which the target image is an individual frame of a sequence of video frames. In video frame embodiments, further consideration of multiple frames can be used to enhance the process and/or to expand the result to a sequence of foreground masks. For example, use of individual or sequences of foreground masks generated using the process described herein are contemplated in a variety of moving object control, intelligence collection, behavior analysis, surveillance and security, and criminal investigation scenarios.

This disclosure provides an effective, robust, and efficient method for shadow removal in model-based foreground and motion detection via background estimation and subtraction. Various exemplary embodiments of the method described herein integrate shadow removal and background subtraction via color-based preprocessing of the incoming video frame, in a manner that is amenable to broad deployment and is computationally efficient. In one exemplary embodiment, the method comprises: i) initializing and updating a background model, wherein an initial background model is obtained using the first N video frames and the background model is updated with each incoming frame; ii) preprocessing the incoming frame, wherein each incoming frame is preprocessed before being compared to the background model for foreground detection; iii) obtaining a foreground mask indicating the location of non-shadow foreground pixels, wherein the background subtraction results in a foreground consisting of real objects only; and iv) refining the foreground mask, wherein the foreground mask is refined by morphological filtering, connected component analysis, convex hull computation, etc.

The various exemplary embodiments of methods and apparatus for processing an image of a scene of interest disclosed below are general and can be implemented by various types of object detection and/or tracking systems. Exemplary embodiments of the methods and apparatus disclosed herein can be seamlessly implemented into existing person tracking, object tracking, and traffic control systems.

The exemplary embodiments of methods and apparatus for processing an image of a scene of interest disclosed herein concern shadow detection/removal in video processing applications so that boundaries or blobs intending to represent tracked foreground objects are not distorted by the presence of of a shadow. The disclosed methods and apparatus are robust and scalable in that they do not make assumptions regarding the scene and do not require parameter tuning.

Figure 2:
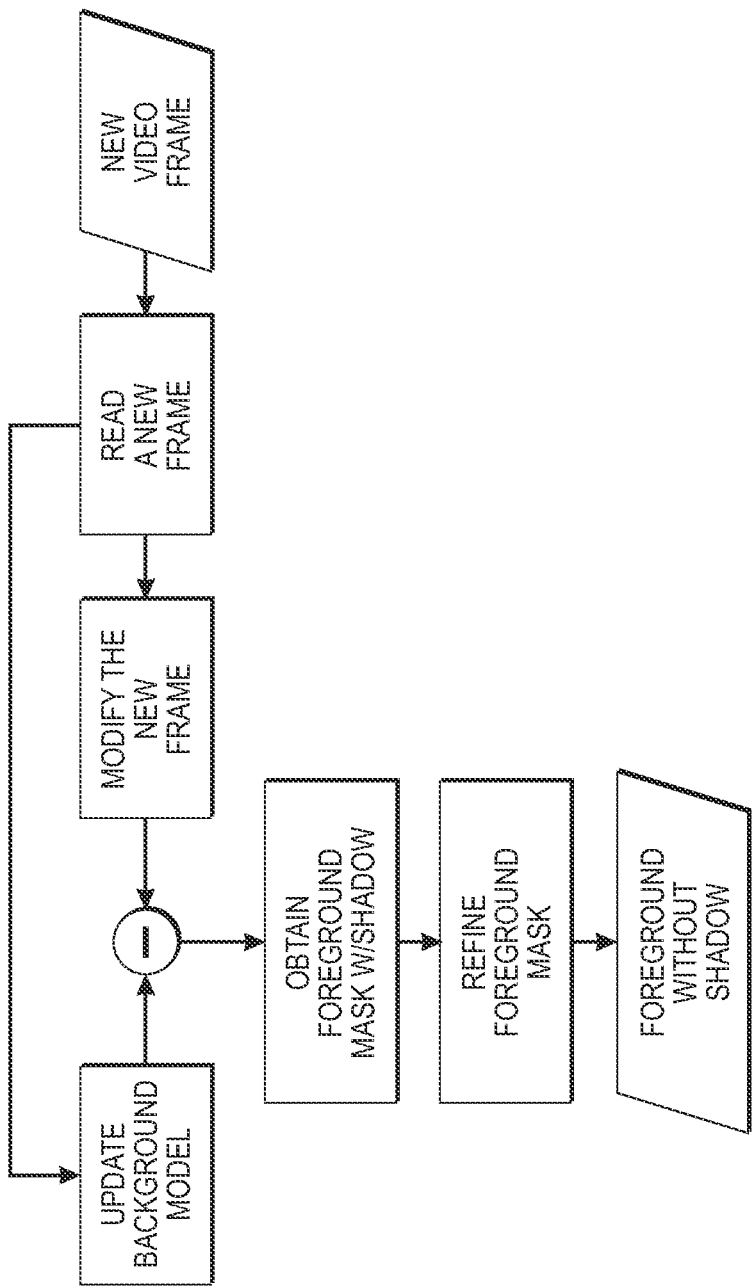
FIG. 2 is a flow chart of an exemplary embodiment of a process for processing an image of a scene of interest.

FIGS. 1 and 2 illustrate salient differences between the method for processing an image of a scene of interest disclosed herein and traditional approaches. A traditional background subtraction method with shadow removal follows the process depicted in FIG. 1. The method disclosed herein follows the process depicted in FIG. 2. For example, the process of FIG. 2 includes a component that "modifies the new frame" which is not included in the process of FIG. 1. Also, the process of FIG. 2 does not include a component that "removes shadow pixels in the foreground mask" as the process of FIG. 1. Note that a training phase associated with generation of an initial background model is omitted from both FIGS. 1 and 2 for brevity.

As used in this document, incoming frame, current frame, and target frame refer to a video frame currently being processed for foreground/motion detection. Where background image, background frame, and background estimate are used in this document, these phrases refer to an image with the same pixel dimensions and color planes as the video being processed that contains the current estimate of a background. Statistical models of the historical values of every pixel in the form of a mixture of Gaussians are maintained and updated. In order to convert this pixel-wise model set, each pixel value in the background frame is assigned a value equal to the weighted sum of means of all Gaussians; note that other alternatives are possible, for example, using the overall statistical mode of each distribution, or a weighted combination of individual means. The background estimate is typically updated on a frame-by-frame basis, although it can be updated at slower rates.

As used in this document, foreground image, foreground frame, and foreground mask relate to a binary mask obtained by comparing (e.g., pixel-wise subtracting or performing goodness of fit tests) the current frame with the current background estimate, followed by thresholding. For example, pixels with a binary value of "1" after the comparison correspond to locations where foreground objects have been detected; conversely, pixels with a binary value of "0" correspond to locations where no foreground objects have been detected. Where background subtraction and foreground detection are used in this document, these phrases refer to the process whereby the foreground image is computed. That is, the process by which foreground areas in the current frame are identified. It typically consists of a pixel-wise subtraction operation, comparison, or the performance of a goodness of fit test between the current frame and the background frame or model, followed by thresholding and potentially morphological filtering.

As used in this document, destination matrix refers to a multi-dimensional matrix representation of the incoming frame. In the case of RGB data, the destination matrix is a three-dimensional (3D) matrix, where one dimension is associated with the row data of the matrix, a second dimension is associated with the column data of the matrix, and a third dimension is associated with the color data of the matrix. Where source matrix is used in this document, this phrase refers to a 3D matrix representation of the background image. As used in this document, copy mask refers to a 3D matrix whose nonzero elements indicate which elements in the source matrix need to be copied onto the destination matrix.

Several techniques for background estimation have been proposed in recent years. Exemplary background models include adaptive background models based on monochromatic images filtered with Gaussian and Gaussian-derivative kernels, background models that combine pixel RGB and chromaticity values with local image gradients, non-parametric background models based on kernel-based estimators, background models obtained by temporal median filtering, and background models that model each pixel by a mixture of Gaussian distributions. For additional information on adaptive background models based on monochromatic images filtered with Gaussian and Gaussian-derivative kernels, see, e.g., Koller et al., Robust Multiple Car Tracking with Occlusion Reasoning, California PATH Program, Institute of Transportation Studies, University of California at Berkeley, 1994, 27 pp. For additional information on background models that combine pixel RGB and chromaticity values with local image gradients, see, e.g., McKenna et al., Tracking Groups of People, Computer Vision and Image Understanding, Vol. 80, Issue 1, October 2000, pp. 42-56. For additional information on non-parametric background models based on kernel-based estimators, see, e.g., Elgammal et al., Background and Foreground Modeling Using Nonparametric Kernel Density Estimation for Visual Surveillance, Proceedings of the IEEE, Vol. 90, Issue 7, July 2002, pp. 1151-1163. For additional information on background models obtained by temporal median filtering, see, e.g., Cucchiara et al., Detecting Moving Objects, Ghosts, and Shadows in video streams," IEEE Transactions on Pattern Analysis and Machine Intelligence, Vol. 25, Issue 10, October 2003, pp 1337-1342. For additional information on background models that model each pixel by a mixture of Gaussian distributions, see, e.g., Stauffer et al., Adaptive Background Mixture Models for Real-time Tracking, IEEE Computer Society Conference on Computer Vision and Pattern Recognition, Vol. 2, Jun. 23, 1999, pp. 246-252.

Among these exemplary background models, the background estimate maintained by means of pixel-wise Gaussian mixture models (GMM) is the most popular due to its robustness to lighting changes, repetitive motions of scene elements, tracking through cluttered regions and slow-moving objects, etc. The GMM approach for generating and maintaining background models is used in the various embodiments of methods and apparatus for processing an image of a scene of interest disclosed herein. However, in practice, the various embodiments disclosed herein can use any technique for generating and maintaining background models.

Using the GMM approach, the first N frames (e.g., N~100) are used to train the background model in the training phase. The background model is successively updated with each incoming frame. In short, model initialization builds statistical models of the historical values of every pixel in the form of a mixture of Gaussians. A background model is said to have been initialized once the parameters that best describe the mixture of Gaussians (mean vectors and covariance matrices for each Gaussian component) for every pixel are determined. An image representation of the statistical background model can be obtained in many ways, for example, by computing a weighted sum of means of all Gaussians on a pixel-by-pixel basis. As an alternative to initialization, a background model of the scene that was previously computed can be retrieved from a storage device or received via network transmission.

Note that, in general, shadows are usually some shade of gray which is represented by three non-zero color component values of in the RGB domain. Conversely, many other colors, such as black, red, blue, green, have at least one zero color component value in the RGB domain. For additional information on color component values for named colors, see, e.g., 500+ Named Colours with rgb and hex values, cloford.com, printed from http://cloford.com/resources/colours/500col.htm on Dec. 5, 2013, Copyright 2000-2011, 13 pp. As can be seen from this webpage, all gray or gray-related colors have non-zero RGB values. Moreover, image areas associated with most cars (even white or gray ones) have pixels whose colors are black, such as those corresponding to tires, window glasses, etc. FIG. 3 provides a table showing RGB values for some common colors.

Figure 4:
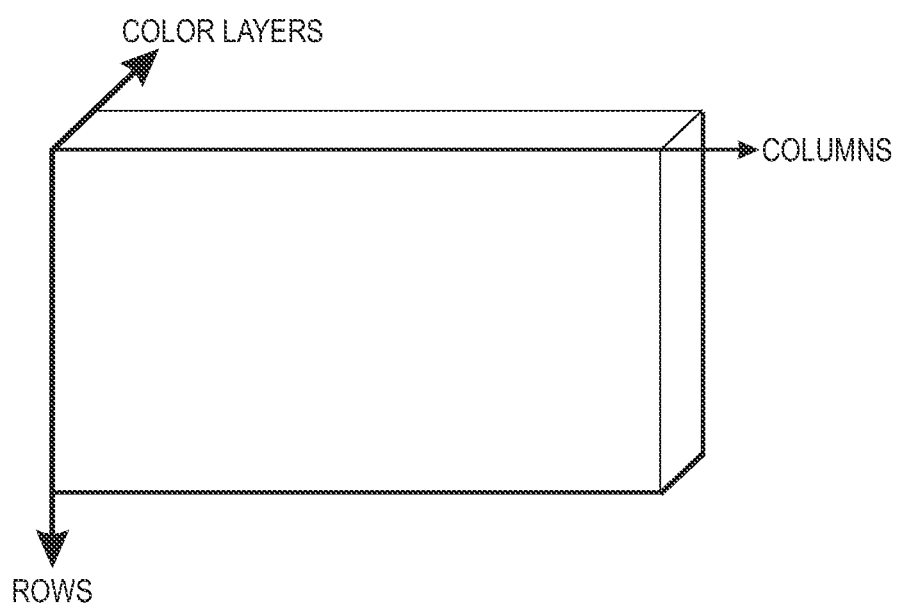
FIG. 4 is a 3-dimensional (3D) diagram showing a view of a color frame as a 3D matrix.

Each RGB video frame can be viewed as a three-dimensional (3D) matrix where the first two indices correspond to row and column locations respectively, and the third index corresponds to RGB color layers (see FIG. 4). Background estimates, being images, can also be represented as 3D matrices. For simplicity, the 3D matrix may be referred to as a matrix in the following description.

In an exemplary embodiment, the incoming (current) frame is viewed as a destination matrix. The current background estimate, or source matrix, is selectively copied onto corresponding pixels in the destination matrix. The current frame is used to generate a copy mask of nonzero elements of the current frame to indicate which matrix elements in the background image need to be copied onto the destination matrix. As a result, groups of pixels including those associated with shadows, and possibly some associated with non-shadows, in the new frame are replaced by the corresponding portions of the background image. If this modified new frame is input to the background model for background subtraction, no shadow areas are included in the resulting foreground. In order to identify the matrix locations that are copied from the source to the destination matrix, a modification identification algorithm comprising a set of pixel-wise modification algorithm tests is performed. Every matrix location with value within a predetermined interval is copied from the source to the destination matrix.

Figure 5:
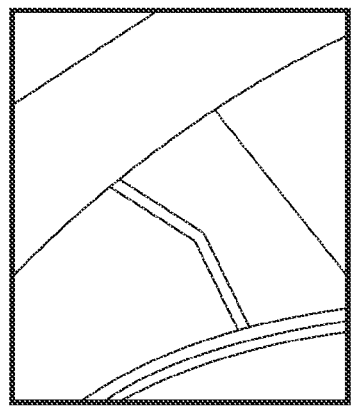
FIG. 5 is a view of an exemplary background estimate for a scene of interest.
Figure 6:
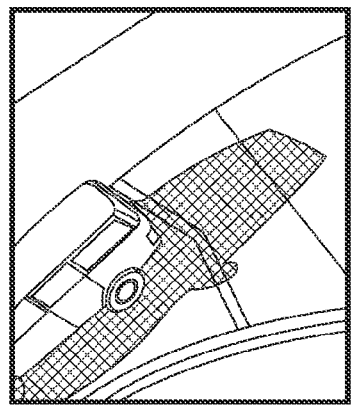
FIG. 6 is a view of an exemplary image of the scene of interest.
Figure 7:
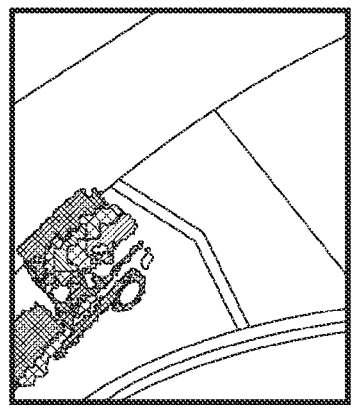
FIG. 7 is a view of the exemplary image of the scene of interest from FIG. 6 with shadow portions of the exemplary image replaced with corresponding portions of the exemplary background estimate.

Certain areas of the current frame (particularly those whose color pixel values contain at most two zero R, G, or B values) will suffer a color modification when the modified frame is computed. This is due to partially copied background image pixels onto the color channels with non-zero value. In one embodiment, matrix locations with values greater than or equal to a predetermined threshold T are copied from the source to the destination matrix. In this case, the modification identification test is equivalent to a thresholding operation. For instance, if the threshold T=1 and if the original color of a car pixel is blue (RGB: $r_d, g_d, b_d$=0, 0, 255) in the destination image and the color of the corresponding pixel in the background image (source image) is sea green 3 (RGB: $r_s, g_s, b_s$=67, 205, 128), then after copying, the resulting pixel in the modified new frame (destination image) becomes navy (RGB: $r_d, g_d, b_s$=0, 0, 128). FIGS. 5-7 show examples of the background model (FIG. 5), the current video frame (FIG. 6), and the modified frame (FIG. 7). As can be seen, there are some changes in color values for some vehicle pixels after modifying. Note that this side effect is mostly inconsequential, since even modified pixel values are different enough from the background pixel values and are thus still detectable as foreground pixels after background subtraction.

Figure 8:
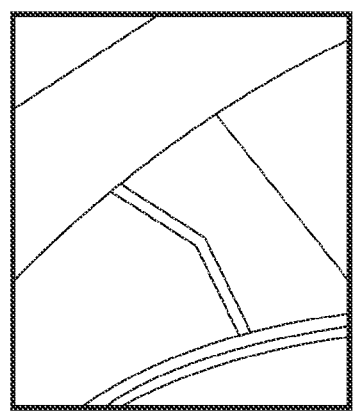
FIG. 8 is a view of the exemplary background estimate of the scene of interest.
Figure 9:
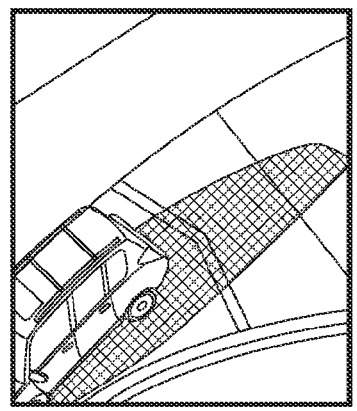
FIG. 9 is a view of another exemplary image of the scene of interest.
Figure 10:
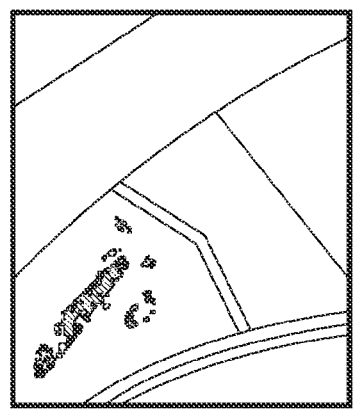
FIG. 10 is a view of the another exemplary image of the scene of interest from FIG. 9 with shadow portions of the another exemplary image replaced with corresponding portions of the exemplary background estimate.

A more extreme case is shown in FIG. 8-10 where a vehicle whose color is mostly white is present in the scene. In this case, the modified frame still contains enough vehicle pixels that the vehicle can still be successfully identified as being part of the foreground after the background subtraction operation.

Note that the above preprocessing scheme is based on the observation that shadow colors have nonzero R/G/B (or, more generally, greater than a threshold T) values. Algorithmically speaking, copy mask equals incoming frame greater than threshold T, which results in a Boolean array with equal dimensions as the incoming frame and true (greater than threshold T) entries where the color value is greater than threshold T. More generally, it is also observed that a shadow color is always a color between black (R/G/B=0) and white (R/G/B=255), therefore it is reasonable to say that the R/G/B value of a shadow color is greater than threshold $T_1$>0 and smaller than threshold $T_2$<255. The previous described procedure can alternatively be implemented as a modification identification test of a pixel value relative to the interval [$T_1$, $T_2$]. As a result, copy mask equals incoming frame greater than threshold $T_1$ and incoming frame smaller than threshold $T_2$. Algorithmically, if copy mask equals incoming frame greater than lower bound and incoming frame less than upper bound, the number of foreground pixels preserved after preprocessing will increase relative to the previously described procedure.

Figure 11:
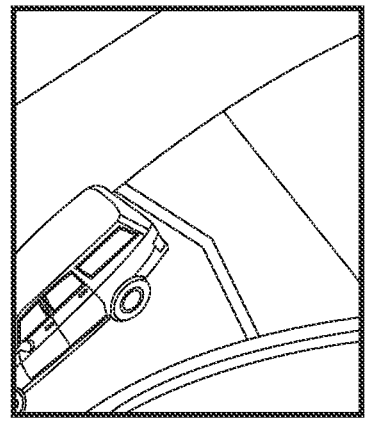
FIG. 11 is a view of the exemplary image of the scene of interest from FIG. 6 with shadow portions of the exemplary image above an lower bound replaced with corresponding portions of the exemplary background estimate.
Figure 12:
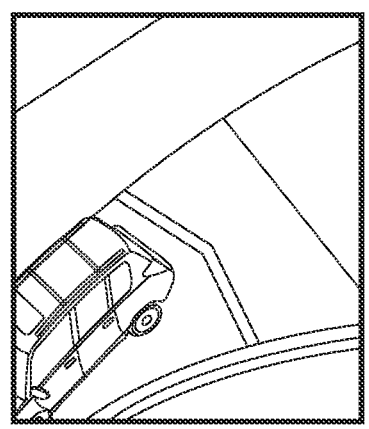
FIG. 12 is a view of the another exemplary image of the scene of interest from FIG. 9 with shadow portions of the another exemplary image below an upper bound replaced with corresponding portions of the exemplary background estimate.

FIG. 11 depicts the preprocessed frames based on the video frame of FIG. 6 but using a different copy mask in which the lower bound threshold $T_1$ is 30. Comparing the modified frames depicted in the figures shows the difference between not using the lower bound (FIG. 7) and using the lower bound (FIG. 11). FIG. 12 depicts the preprocessed frames based on the video frame of FIG. 9 but using a different copy mask in which the upper bound threshold $T_2$ is 250. Comparing the modified frames depicted in the figures shows the difference between not using the upper bound (FIG. 10) and using the upper bound (FIG. 12).

Figure 13:
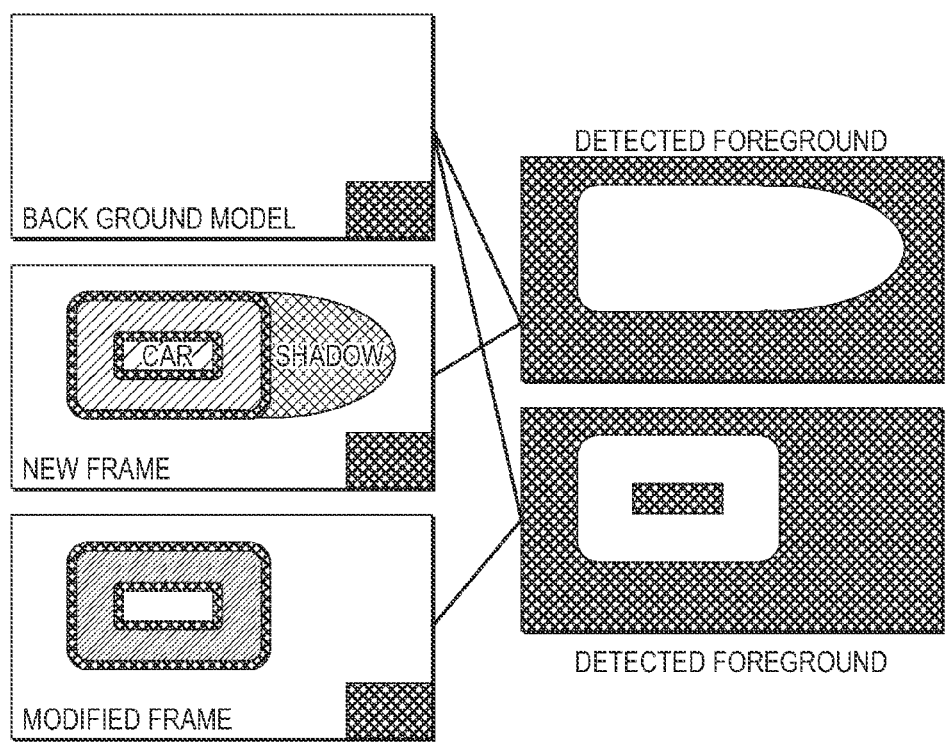
FIG. 13 is a functional diagram of another exemplary embodiment of a process for processing an image of a scene of interest.
Figures 14, 15:
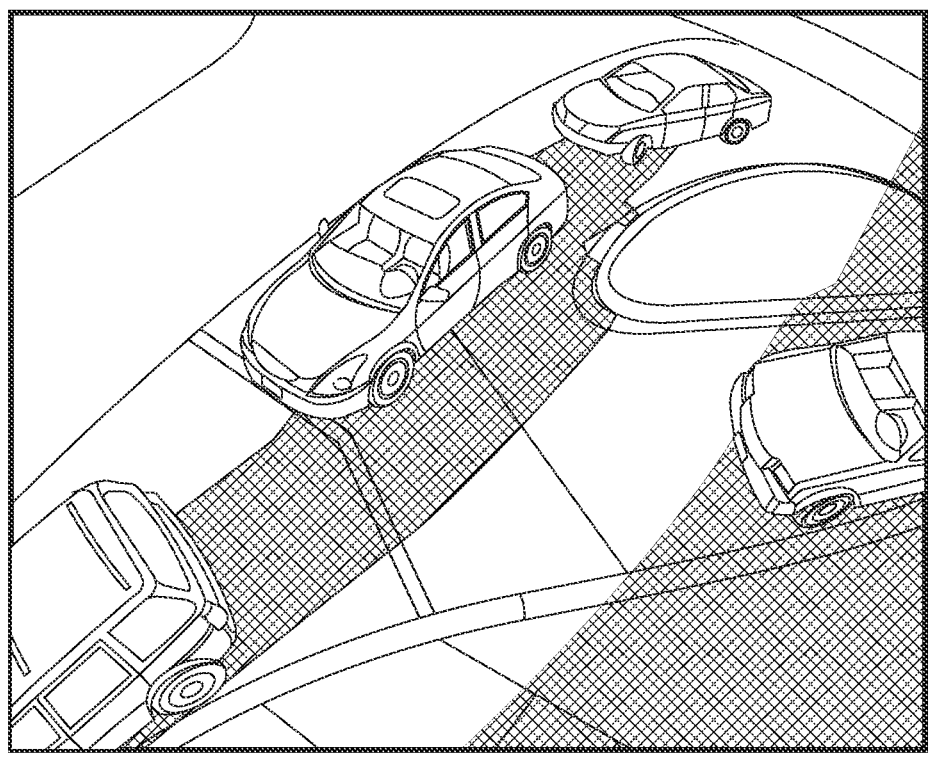
FIG. 14 is a tabular grid showing RGB values for some colors used in the view shown in FIGS. 11 and 12.
FIG. 15 is a view of yet another exemplary image of the scene of interest.

As the process continues, the modified frame is input along with the current background model to a background subtraction process which results in a foreground mask. FIG. 13 illustrates the detected foreground mask with and without the described frame preprocessing. FIG. 15 shows a list of the RGB values of the colors used in this example so as to illustrate color change before and after modification. The traditional shadow removal scheme first obtains a foreground mask based on the current frame and the background estimate, as shown on the top right block of FIG. 13. It can be seen that the detected foreground mask contains pixels corresponding to both the vehicle and its cast shadow. An additional step is required for shadow removal, whereby a decision is made about whether each detected foreground pixel is a shadow pixel or not. Consequently, the computational efficiency of traditional methods will decrease dramatically as the number of raw (originally detected) foreground pixels grows. On the other hand, the method disclosed herein obtains a clean foreground mask (see lower right block of FIG. 13) containing only vehicle pixels through a background subtraction process which takes the above described modified frame as an input, along with the traditional background model. Unlike traditional methods, the efficiency of the method disclosed herein does not depend on the number of raw foreground pixels.

Morphological filtering is applied to the initial foreground mask for noise removal. Additionally, a connected component analysis can also be applied to segment distinct foreground objects from one another. Optionally, and depending on the specific application, the convex hull for each detected connected component can also be computed.

FIG. 15 shows a sample image from the monitored scene. Without a shadow removal technique, multiple cars will be identified as a single moving object during morning hours due to the length of the cast shadows. A sample video used in conjunction with this scenario was 1.5 hours in length and captured activity during the peak breakfast hour on a sunny morning when cast shadows are the strongest. In conjunction with demonstration of a prototype, the shadow removal technique described herein was implemented with the GMM background subtraction method.

The performance of the method and algorithms disclosed herein for shadow removal and background subtraction was compared to the foreground detector from Zivkovic coupled with the shadow removal technique from Prati which were considered more accurate and computationally efficient than most other traditional algorithms. For additional information on the Zivkovic foreground detector, see, e.g., Zivkovic, Improved Adaptive Gaussian Mixture Model for Background Subtraction, Proceedings of the 17th International Conference on Pattern Recognition, Vol. 2, Aug. 23, 2004, pp. 28-31. For additional information on the Prati shadow removal technique, see, e.g., Prati et al., Detecting Moving Shadows: Algorithms and Evaluation, IEEE Transactions on Pattern Analysis and Machine Intelligence, Vol. 25, No. 7, July 2003, pp. 918-923.

The performance of the algorithms was measured as suggested by Smith in "Evaluating Multi-Object Tracking." Specifically, the number of true positives (i.e., number of foreground blobs detected that correspond to an actual vehicle), false positives (i.e., number of foreground blobs detected that correspond to no vehicles), and false negatives (i.e., number of vehicles without a corresponding foreground blob) were counted on a frame-by-frame basis across 10 k frames. Table 2 summarizes the results. For additional information on the Smith evaluation techniques, see, e.g., Smith et al., Evaluating Multi-Object Tracking, IEEE Computer Society Conference on Computer Vision and Pattern Recognition—Workshop on Empirical Evaluation Methods in Computer Vision (EEMCV), June 2005, 7 pp.

| | Foreground Detection Performance of the Proposed Method Throughout the Video | | | | |
|---|---|---|---|---|---|
| | True Positive | False Positive | False Negative | Precision | Recall |
| Zivkovic/ Prati | 16906 | 4368 | 7811 | 79.5% | 68.4% |
| Prototype | 24136 | 181 | 581 | 99.3% | 97.7% |

The computational efficiency of the proposed algorithm was compared to that of the Zivkovic foreground detection algorithm coupled with the Prati shadow removal technique. A total of 10,000 frames were processed by both algorithms on the same system and the execution time was measured. The algorithm from the prototype was about 25% faster than the Prati shadow-removal algorithm. We note that the gap in performance will increase as the total area of foreground objects increases.

While the detector with shadow removal from Prati still performs acceptably in terms of blob-level precision and recall in such challenging scenario, the numbers from the table do not reflect the magnitude of its detection inaccuracy. To show this, analysis of pixel-level (as opposed to blob-level) precision and recall was performed on sample foreground masks detected by the two methods (computing pixel-level metrics for full videos is extremely time consuming, see results shown in FIG. 16). In this example, although the numbers of blob-level true positive, false positive, false negative are the same for the two methods, the prototype method outperforms the Prati method in terms of pixel-level precision and recall. Here, true positives are defined as detected foreground pixels that correspond to a vehicle, false positives as detected foreground pixels that correspond to no vehicle, and false negatives as vehicle pixels that are not detected as foreground.

Figure 16:
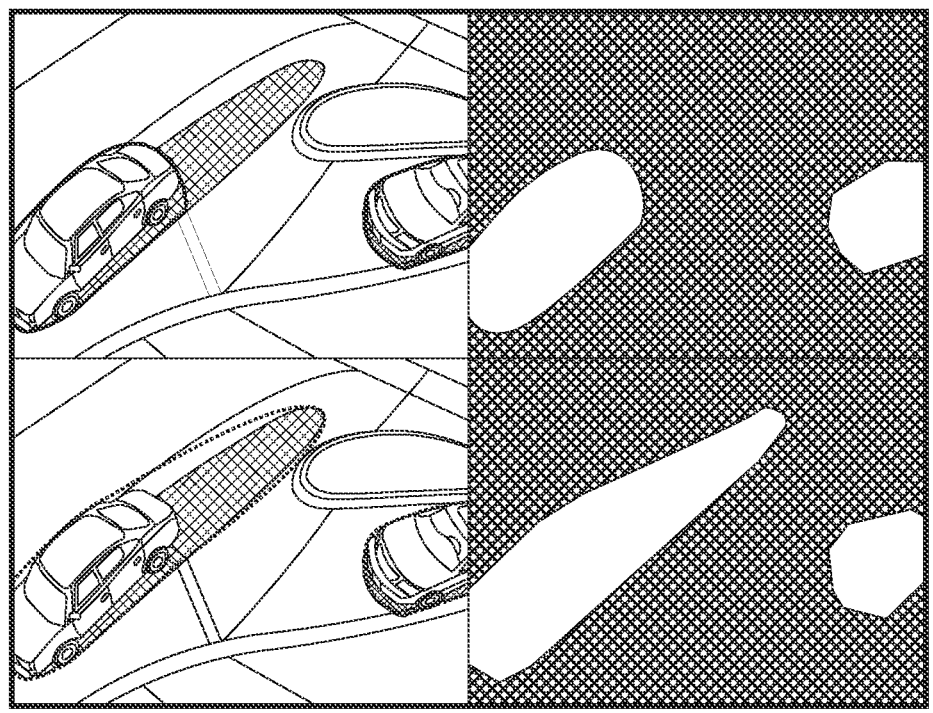
FIG. 16 is a set of views of still another exemplary image of the scene of interest with exemplary views of a foreground mask generated using different techniques for processing an image of a scene of interest.

FIG. 16 shows an annotated frame by the prototype method (upper left), foreground mask by prototype method (upper right), annotated frame by Prati method (bottom left) and foreground mask by Prati (bottom right).

TABLE 3

Foreground detection performance of the proposed method at one frame
Foreground Detection Performance of the Prototype Method at One Frame

| | True Positive (pixels) | False Positive (pixels) | False Negative (pixels) | Precision | Recall |
|---|---|---|---|---|---|
| Prototype | 12585 | 1288 | 152 | 90.7% | 98.8% |
| Zivkovic/ Prati | 12393 | 6429 | 344 | 65.8% | 97.3% |

In summary, various embodiments of a method for processing an image of a scene of interest integrate algorithms for shadow removal with algorithms for background subtraction. The shadow removal algorithm can remove shadows by observation of a difference between colors of a shadow pixel and a vehicle pixel in the RGB domain. The algorithms of the various embodiments do not make assumptions of the scene and do not require parameter tuning.

The various embodiments of a method for processing an image of a scene of interest disclosed herein are more robust and scalable than traditional methods since they do not involve tuning any parameters in order to adapt to different scenes or applications. The methods disclosed herein are more computationally efficient because shadow removal is integrated with background subtraction. The computational complexity of the proposed method remains the same across frames, whereas the traditional method slows down as the number of raw foreground pixels increases.

Figure 17:
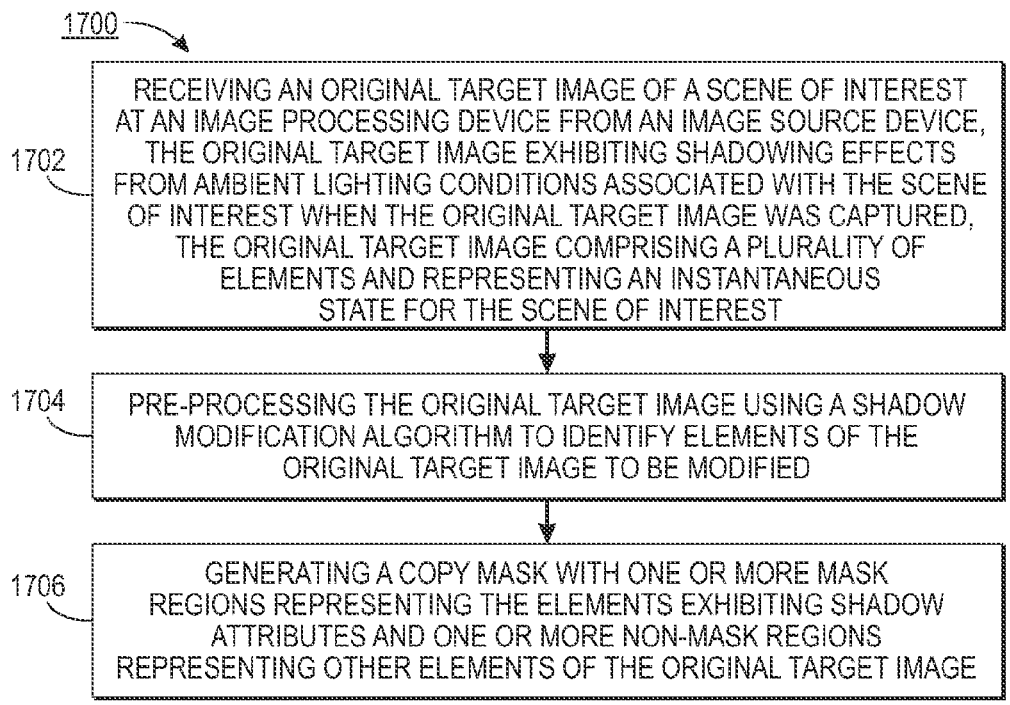
FIG. 17 is a flowchart of yet another exemplary embodiment of a process for processing an image of a scene of interest.

With reference to FIG. 17, an exemplary embodiment of a process 1700 for processing an image of a scene of interest begins at 1702 where an original target image of a scene of interest is received at an image processing device from an image source device. The original target image exhibiting shadowing effects from ambient lighting conditions associated with the scene of interest when the original target image was captured. The original target image comprising a plurality of elements and representing an instantaneous state for the scene of interest. At 1704, the original target image is pre-processed using a modification identification algorithm to identify elements of the original target image to be modified. Next, a copy mask with one or more mask regions representing the elements to be modified is generated (1706). The copy mask also includes one or more non-mask regions representing other elements of the original target image. As described above, a modification identification test may be applied to RGB values of the target image to generate the copy mask.

In another embodiment, the process 1700 also includes receiving a baseline background model of the scene of interest at the image processing device from a storage device. The baseline background model comprising a plurality of elements and representing a baseline state for the scene of interest.

In yet another embodiment, the process 1700 also includes processing the copy mask using a filtering algorithm to perform morphological filtering, segmentation, refinement, or any other type of image filtering in any suitable combination. For example, the filtering algorithm may include any suitable combination of i) connecting mask regions within a predetermined distance from each other, ii) converting mask regions smaller than a predetermined area into non-mask regions, iii) converting non-mask regions smaller than a predetermined area into mask regions, iv) converting non-mask regions surrounded by mask regions into mask regions, v) smoothing boundaries of mask regions, vi) comparing mask regions to predetermined shapes, and vii) adjusting each mask region that matches a corresponding predetermined shape within a predetermined tolerance to conform the shape of the corresponding mask region to the matching predetermined shape.

In still another embodiment of the process 1700, the original target image of the scene of interest is a color raster graphics image. In still yet another embodiment of the process 1700, the original target image of the scene of interest is a select video frame from a color video of the scene of interest. In another embodiment of the process 1700, the image source device includes a video camera, a digital camera, a storage device, a computer device, a communication device, or any other type of image source device in any suitable combination. In yet another embodiment of the process 1700, the plurality of elements of the original target image are formed by a plurality of pixels.

Figure 18:
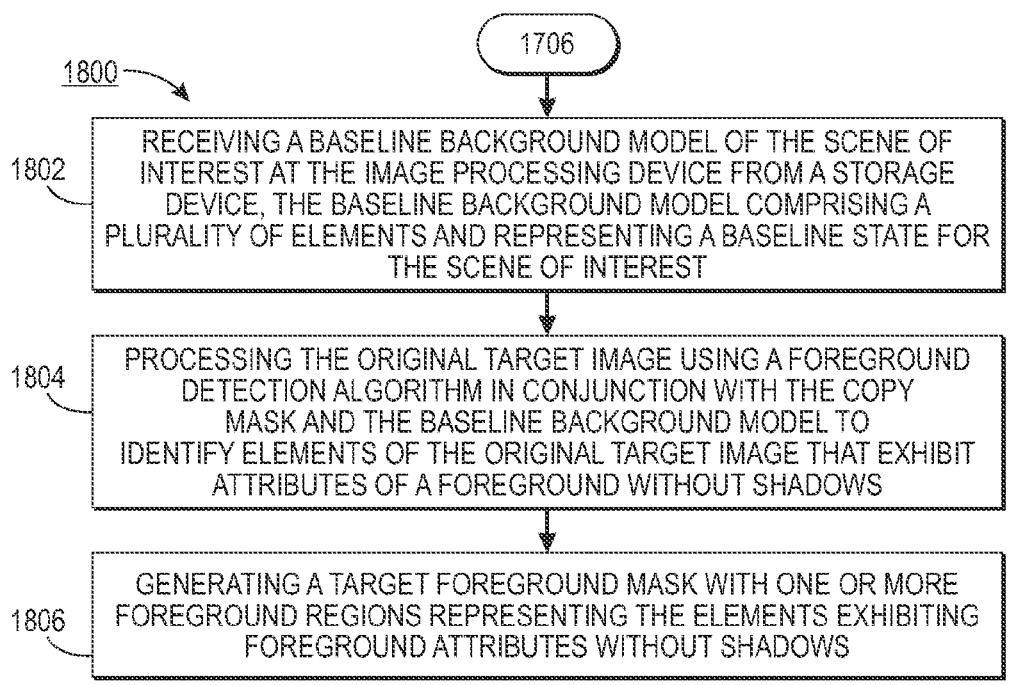
FIG. 18, in conjunction with FIG. 17, is a flowchart of still another exemplary embodiment of a process for processing an image of a scene of interest.

With reference to FIGS. 17 and 18, another embodiment of a process 1800 for processing an image of a scene of interest includes the process 1700 of FIG. 17 and continues from 1706 to 1802 where a baseline background model of the scene of interest is received at the image processing device from a storage device. The baseline background model comprises a plurality of elements and representing a baseline state for the scene of interest. At 1804, the original target image is processed in conjunction with the copy mask and the baseline background model, and using a foreground detection algorithm to identify elements of the original target image that exhibit attributes of a foreground without shadows. Next, a target foreground mask with one or more foreground regions representing the elements exhibiting foreground attributes without shadows is generated (1806). The target foreground mask also includes one or more non-foreground regions representing the elements to be modified and other elements of the original target image not exhibiting shadow or foreground attributes.

In another embodiment, the process 1800 also includes post-processing the original target image using a foreground detection algorithm in conjunction with the target foreground mask to perform i) segmenting the original target image into foreground and other regions, ii) identifying one or more foreground objects corresponding to the one or more foreground regions of the original target image, iii) removing the other regions from the original target image, or iv) any other type of foreground extraction technique in any suitable combination.

In yet another embodiment, the process 1800 also includes post-processing the original target image using an image segmentation algorithm in conjunction with the target foreground mask to perform i) segmenting the original target image into shadow, foreground, and background regions, ii) identifying one or more shadow objects corresponding to the one or more mask regions of the original target image, iii) identifying one or more foreground objects corresponding to the one or more foreground regions of the original target image, iv) identifying a background portion corresponding to other regions of the original target image, or v) any other type of image segmentation technique in any suitable combination.

In still another embodiment, the process 1800 also includes processing the target foreground mask using a filtering algorithm to perform morphological filtering, segmentation, refinement, or any type of image filtering in any suitable combination. For example, the filtering algorithm may include any suitable combination of i) connecting foreground regions within a predetermined distance from each other, ii) converting foreground regions smaller than a predetermined area into non-foreground regions, iii) converting non-foreground regions smaller than a predetermined area into foreground regions, iv) converting non-foreground regions surrounded by foreground regions into foreground regions, smoothing boundaries of foreground regions, v) comparing foreground regions to predetermined shapes, and vi) adjusting each foreground region that matches a corresponding predetermined shape within a predetermined tolerance to conform the shape of the corresponding foreground region to the matching predetermined shape.

In another embodiment of the process 1800, the baseline background model of the scene of interest is based at least in part on a plurality of color images of the scene of interest over a select time period from at least one eyepoint. In a further embodiment, the baseline background model is updated by adding the original target image to the plurality of color images on which the baseline background model is based. In another further embodiment, the baseline background model is based at least in part on analysis and manipulation of corresponding elements within the plurality of color images. For example, the analysis and manipulation may include averaging, statistical analysis, bit tests, mathematical analysis, histogram analysis, filtering, or any other type of analysis and/or manipulation technique in any suitable combination.

In yet another embodiment of the process 1800, the baseline background model of the scene of interest is based at least in part on a plurality of video frames from one or more color videos of the scene of interest. In a further embodiment, the plurality of video frames are periodically updated by applying a sliding time window to select video frames from the one or more color videos on which the baseline background model is based.

In still yet another embodiment of the process 1800, elements of the original target image that exhibit attributes of the foreground without shadows include elements of the original target image that do not exhibit shadow attributes and elements of the original target image that have a different color than a corresponding element of the baseline background image.

In still yet another embodiment of the process 1800, the storage device includes a local storage device, a remote storage device, a temporary storage device, a portable storage device, a removable storage device, or any other type of storage device in any suitable combination. In another embodiment of the process 1800, the plurality of elements of the baseline background model are formed by a plurality of pixels.

Figure 19:
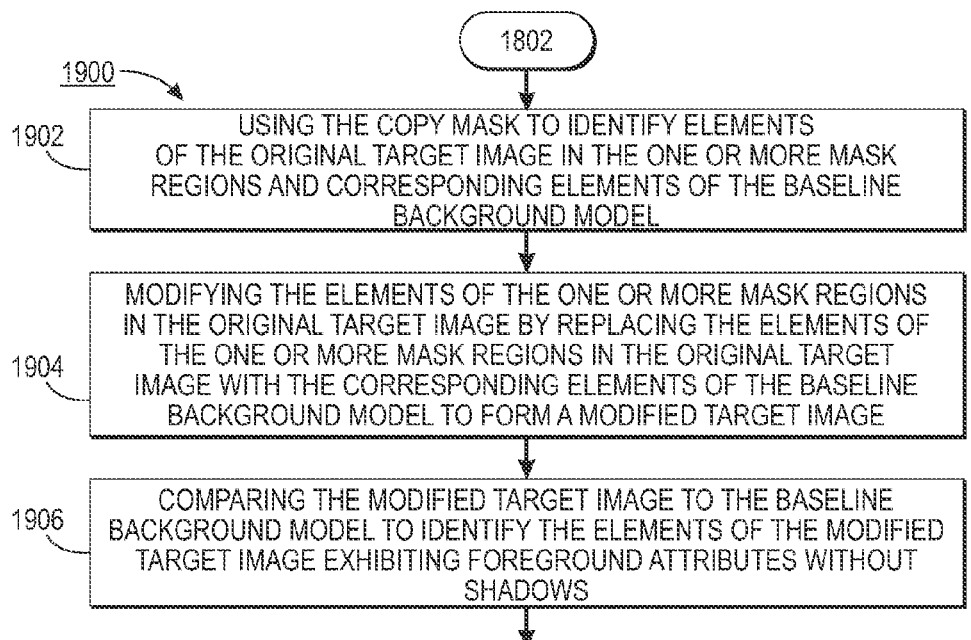
FIG. 19, in conjunction with FIGS. 17 and 18, is a flowchart of still yet another exemplary embodiment of a process for processing an image of a scene of interest.

With reference to FIGS. 17-19, another embodiment of a process 1900 for processing an image of a scene of interest includes the processes 1700, 1800 of FIGS. 17 and 18 and provides an exemplary embodiment of the processing associated with the foreground detection algorithm at 1804. The process 1900 continues from 1802 to 1902 where the copy mask is used to identify elements of the original target image in the one or more mask regions and corresponding elements of the baseline background model. At 1904, the elements of the one or more mask regions in the original target image are modified by replacing the elements of the one or more mask regions in the original target image with the corresponding elements of the baseline background model to form a modified target image. Next, the modified target image is compared to the baseline background model to identify the elements of the modified target image exhibiting foreground attributes without shadows (1906). The process 1900 continues from 1906 to 1706. As described above, a modification identification test may be applied to RGB values of the target image to identify the elements to be modified in the original target image. In other embodiments of the process 1900, the elements of the one or more mask regions in the original target image may be modified using a mathematical function, a statistical function, a logical function, or any suitable manipulative function in any suitable combination to form the modified target image.

Figure 20:
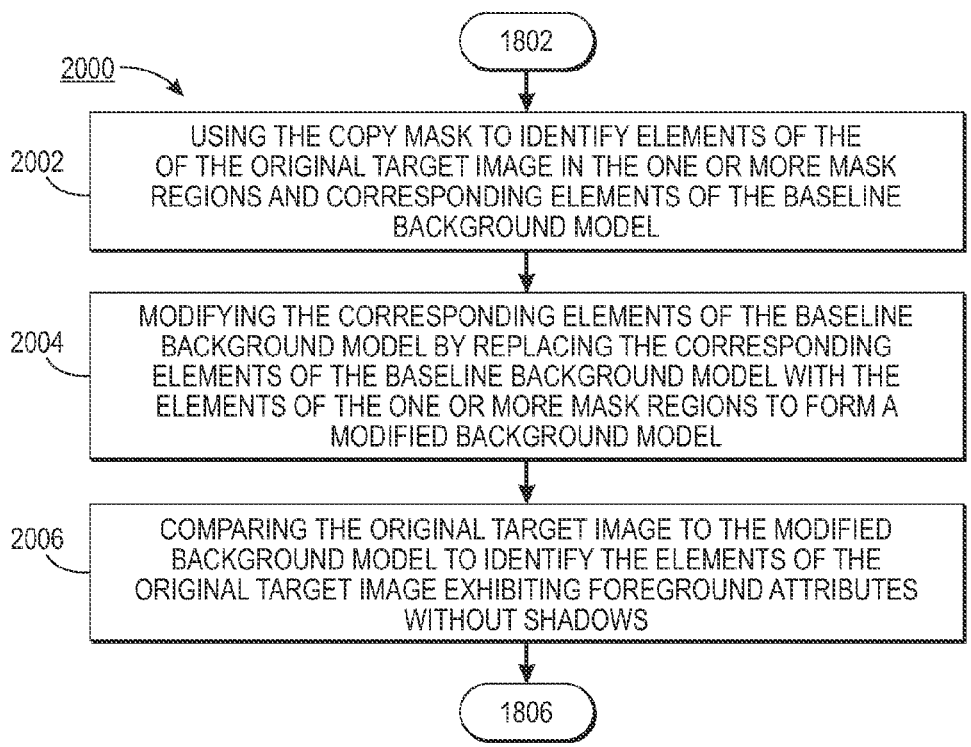
FIG. 20, in conjunction with FIGS. 17 and 18, is a flowchart of another exemplary embodiment of a process for processing an image of a scene of interest.

With reference to FIGS. 17, 18, and 20, another embodiment of a process 2000 for processing an image of a scene of interest includes the processes 1700, 1800 of FIGS. 17 and 18 and provides another exemplary embodiment of the processing associated with the foreground detection algorithm at 1804. The process 2000 continues from 1802 to 2002 where the copy mask is used to identify elements of the original target image in the one or more mask regions and corresponding elements of the baseline background model. At 2004, the corresponding elements of the baseline background model are modified by replacing the corresponding elements of the baseline background model with the elements of the one or more mask regions to form a modified background model. Next, the original target image is compared to the modified background model to identify the elements of the original target image exhibiting foreground attributes without shadows (2006). The process 2000 continues from 2006 to 1706. As described above, a modification identification algorithm comprising a set of pixel-wise modification algorithm tests that are be applied to RGB values of the target image to identify the elements to be modified in the background model may be performed. In other embodiments of the process 2000, the elements of the one or more mask regions in the baseline background model may be modified using a mathematical function, a statistical function, a logical function, or any suitable manipulative function in any suitable combination to form the modified target image.

Figure 21:
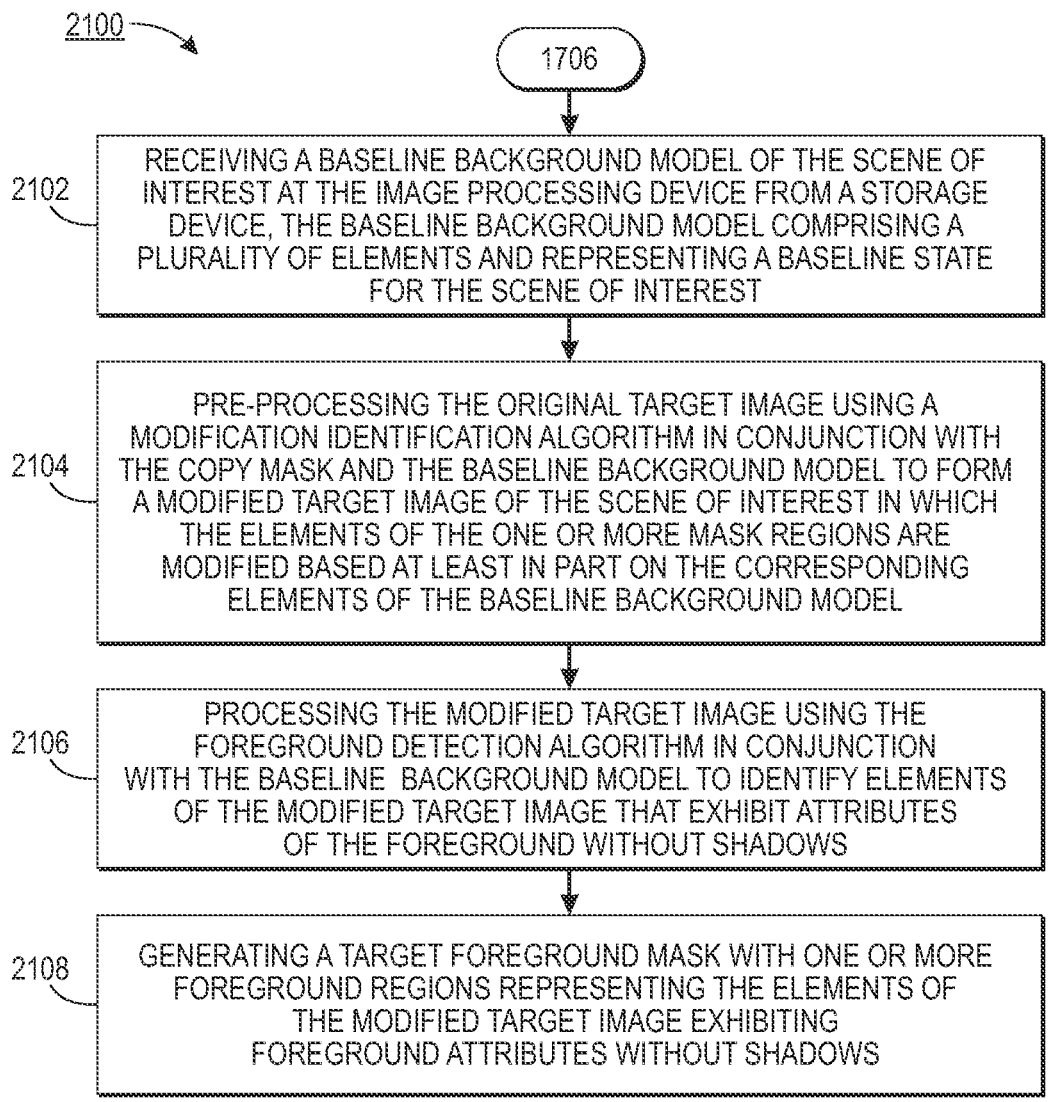
FIG. 21, in conjunction with FIG. 17, is a flowchart of yet another exemplary embodiment of a process for processing an image of a scene of interest.

With reference to FIGS. 17 and 21, another embodiment of a process 2100 for processing an image of a scene of interest includes the process 1700 of FIG. 17 and continues from 1706 to 2102 where a baseline background model of the scene of interest is received at the image processing device from a storage device. The baseline background model comprising a plurality of elements and representing a baseline state for the scene of interest. At 2104, the original target image is pre-processed using a shadow extraction algorithm in conjunction with the copy mask and the baseline background model to form a modified target image of the scene of interest in which the elements of the one or more mask regions are modified based at least in part on the corresponding elements of the baseline background model. Next, the modified target image is processed using a foreground detection algorithm in conjunction with the baseline background model to identify elements of the modified target image that exhibit attributes of a foreground without shadows (2106). At 2108, a target foreground mask with one or more foreground regions representing the elements exhibiting foreground attributes without shadows is generated. The target foreground mask also includes one or more non-foreground regions representing other elements of the modified target image.

In another embodiment, in conjunction with the pre-processing associated with the modification identification algorithm, the process 2100 also includes using the copy mask to identify elements of the original target image in the one or more mask regions and corresponding elements of the baseline background model. In this embodiment, the elements of the one or more mask regions in the original target image are modified by replacing the elements of the one or more mask regions in the original target image with the corresponding elements of the baseline background model to form the modified target image. In a further embodiment, in conjunction with the processing associated with the foreground detection algorithm, the process 2100 also includes comparing the modified target image to the baseline background model to identify the elements of the modified target image exhibiting foreground attributes without shadows. As described above, a modification identification test may be applied to RGB values of the target image to identify the elements to be modified in the original target image.

In yet another embodiment of the process 2100, the modified target image provides a temporary target image for an intermediate portion of the processing of the original target image. A subsequent portion of the processing reverts back to the original target image.

Figure 22:
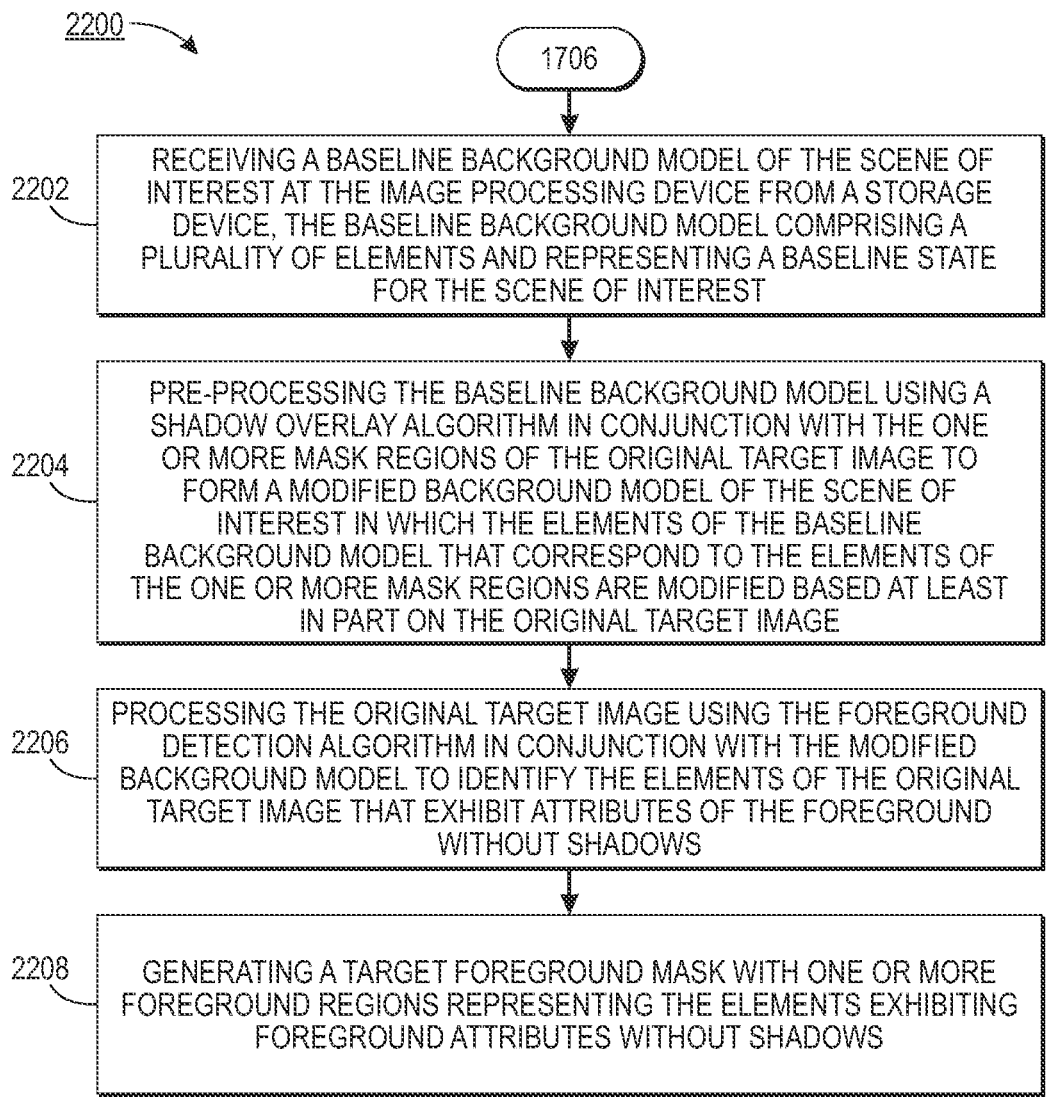
FIG. 22, in conjunction with FIG. 17, is a flowchart of still another exemplary embodiment of a process for processing an image of a scene of interest.

With reference to FIGS. 17 and 22, another embodiment of a process 2200 for processing an image of a scene of interest includes the process 1700 of FIG. 17 and continues from 1706 to 2202 where a baseline background model of the scene of interest is received at the image processing device from a storage device. The baseline background model comprising a plurality of elements and representing a baseline state for the scene of interest. At 2204, the baseline background model is pre-processed using a shadow overlay algorithm in conjunction with the one or more mask regions of the original target image to form a modified background model of the scene of interest in which the elements of the baseline background model that correspond to the elements of the one or more mask regions are modified based at least in part on the corresponding elements of the original target image. Next, the original target image is processed using a foreground detection algorithm in conjunction with the modified background model to identify elements of the original target image that exhibit attributes of a foreground without shadows (2206). At 2208, a target foreground mask with one or more foreground regions representing the elements exhibiting foreground attributes without shadows is generated. The target foreground mask also includes one or more non-foreground regions representing other elements of the original target image.

In another embodiment, in conjunction with the pre-processing associated with the shadow overlay algorithm, the process 2200 also includes using the copy mask to identify elements of the original target image in the one or more mask regions and corresponding elements of the baseline background model. In this embodiment, the corresponding elements of the baseline background model are modified by replacing the corresponding elements of the baseline background model with the elements of the one or more mask regions to form the modified background model. In a further embodiment, in conjunction with the processing associated with the foreground detection algorithm, the process 2200 includes comparing the original target image to the modified background model to identify the elements of the original target image exhibiting foreground attributes without shadows. As described above, a modification identification test may be applied to RGB values of the target image to identify the elements to be modified in the background model.

In yet another embodiment of the process 2200, the modified background model provides a temporary background model for processing the original target image of the scene of interest. Processing of a next target image of the scene of interest reverts back to the baseline background model.

Figure 23:
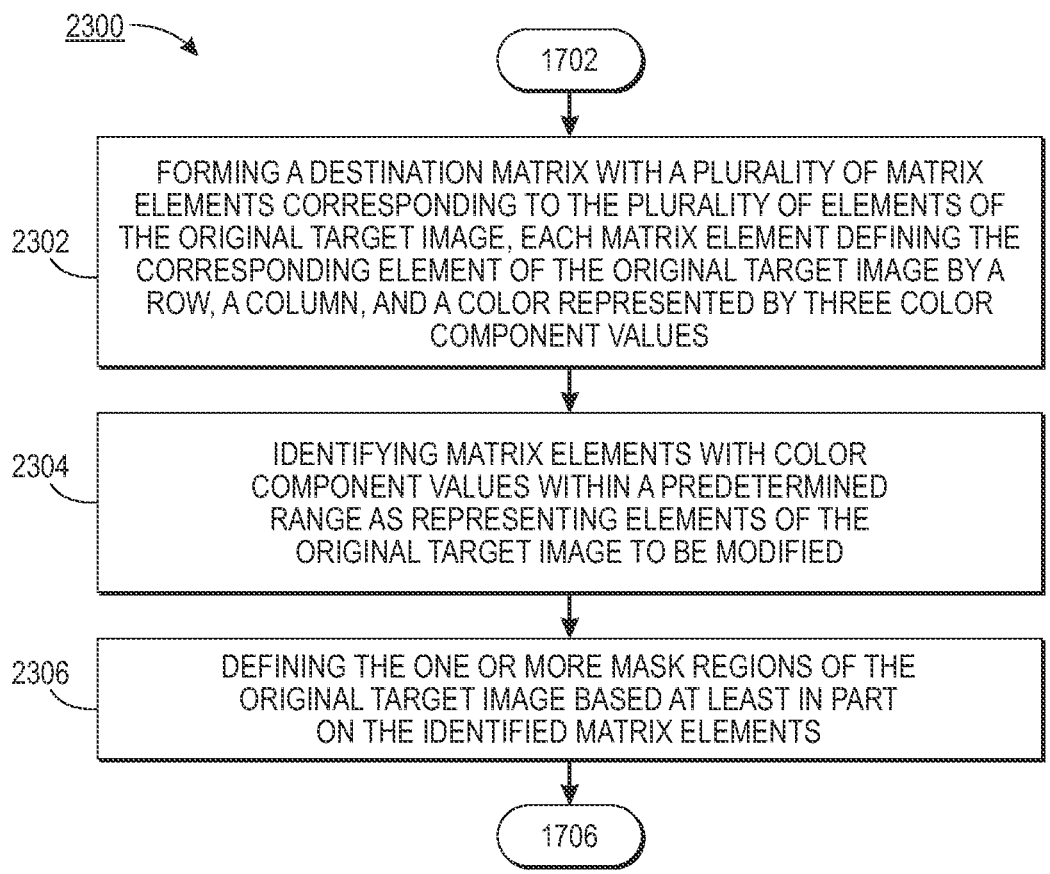
FIG. 23, in conjunction with FIG. 17, is a flowchart of still yet another exemplary embodiment of a process for processing an image of a scene of interest.

With reference to FIGS. 17 and 23, another embodiment of a process 2300 for processing an image of a scene of interest includes the process 1700 of FIG. 17 and provides an exemplary embodiment of the pre-processing associated with the modification identification algorithm at 1704. The process 2300 continues from 1702 to 2302 where a destination matrix with a plurality of matrix elements corresponding to the plurality of elements of the original target image is formed. Each matrix element defining the corresponding element of the original target image by a row, a column, and a color represented by three color component values. At 2304, matrix elements with color component values within a predetermined range are identified as representing elements of the original target image to be modified. Next, the one or more mask regions of the original target image are defined based at least in part on the identified matrix elements (2306).

In another embodiment of the process 2300, the identifying of matrix elements with color component values within the predetermined range filters out matrix elements with color component values representing a white and black, matrix elements with color component values approaching white within a first predetermined threshold, and matrix elements with color component values approaching black within a second predetermined threshold. In a further embodiment, white and black are represented by 255, 255, 255 and 0, 0, 0 color component values, respectively, in relation to an RGB color space. In an even further embodiment, the first and second predetermined thresholds are represented by 250, 250, 250 and 30, 30, 30 color component values, respectively, in relation to the RGB color space.

In yet another embodiment of the process 2300, the color of each element of the original target image is represented by R, G, B color component values in relation to an RGB color space.

Figure 24:
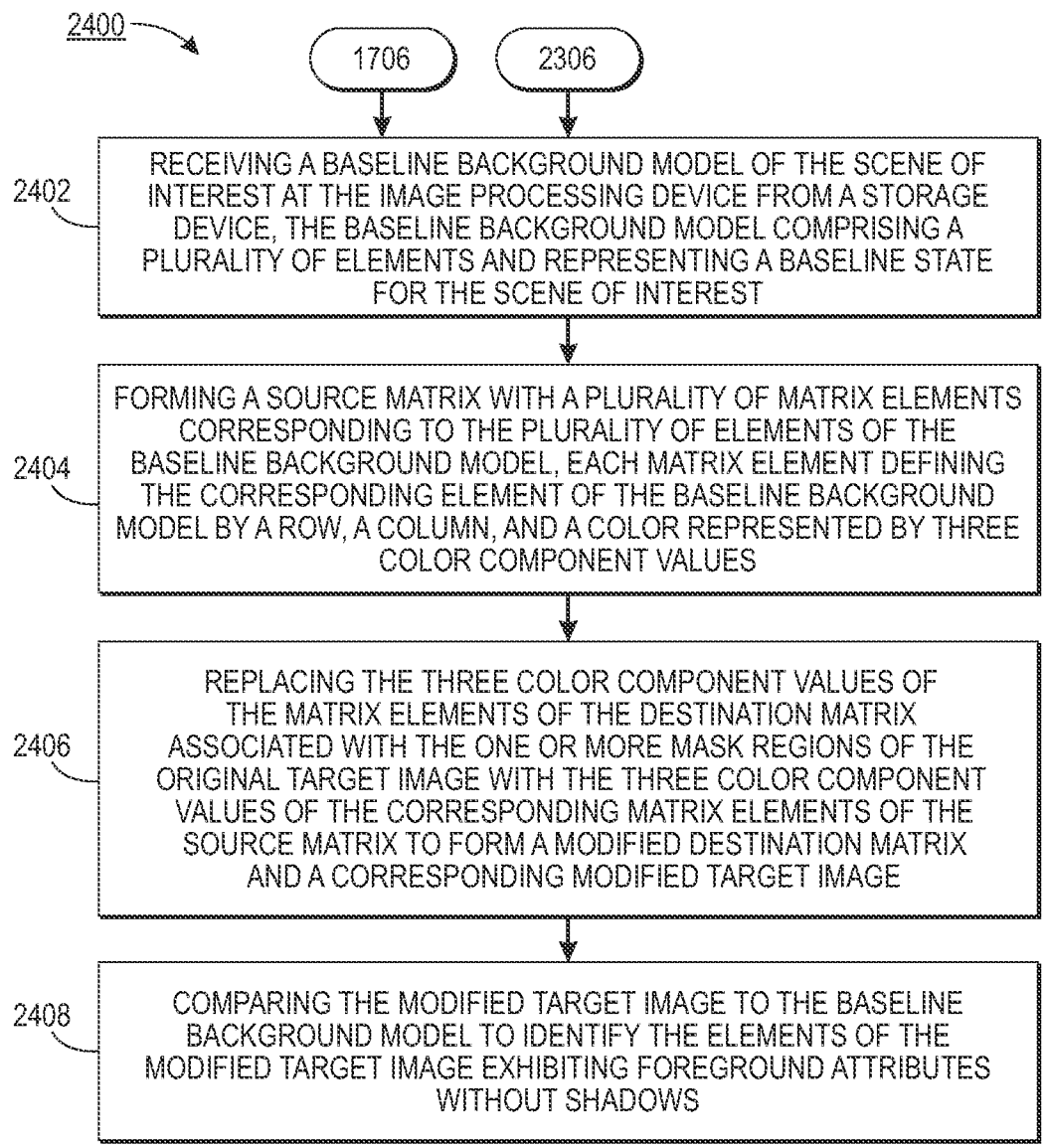
FIG. 24, in conjunction with FIGS. 17 and 23, is a flowchart of another exemplary embodiment of a process for processing an image of a scene of interest.

With reference to FIGS. 17, 23, and 24, another embodiment of a process 2400 for processing an image of a scene of interest includes the processes 1700, 2300 of FIGS. 17 and 23 and continues from 1706 and 2306 to 2402 where a baseline background model of the scene of interest is received at the image processing device from a storage device, the baseline background model comprising a plurality of elements and representing a baseline state for the scene of interest. At 2404, a source matrix with a plurality of matrix elements corresponding to the plurality of elements of the baseline background model is formed. Each matrix element defining the corresponding element of the baseline background model by a row, a column, and a color represented by three color component values. Next, the three color component values of the matrix elements of the destination matrix associated are replaced with the one or more mask regions of the original target image with the three color component values of the corresponding matrix elements of the source matrix to form a modified destination matrix and a corresponding modified target image (2406). At 2408, the modified target image is compared to the baseline background model to identify the elements of the modified target image exhibiting foreground attributes without shadows.

In another embodiment of the process 2400, the color of each element of the baseline background model is represented by R, G, B color component values in relation to an RGB color space.

Figure 25:
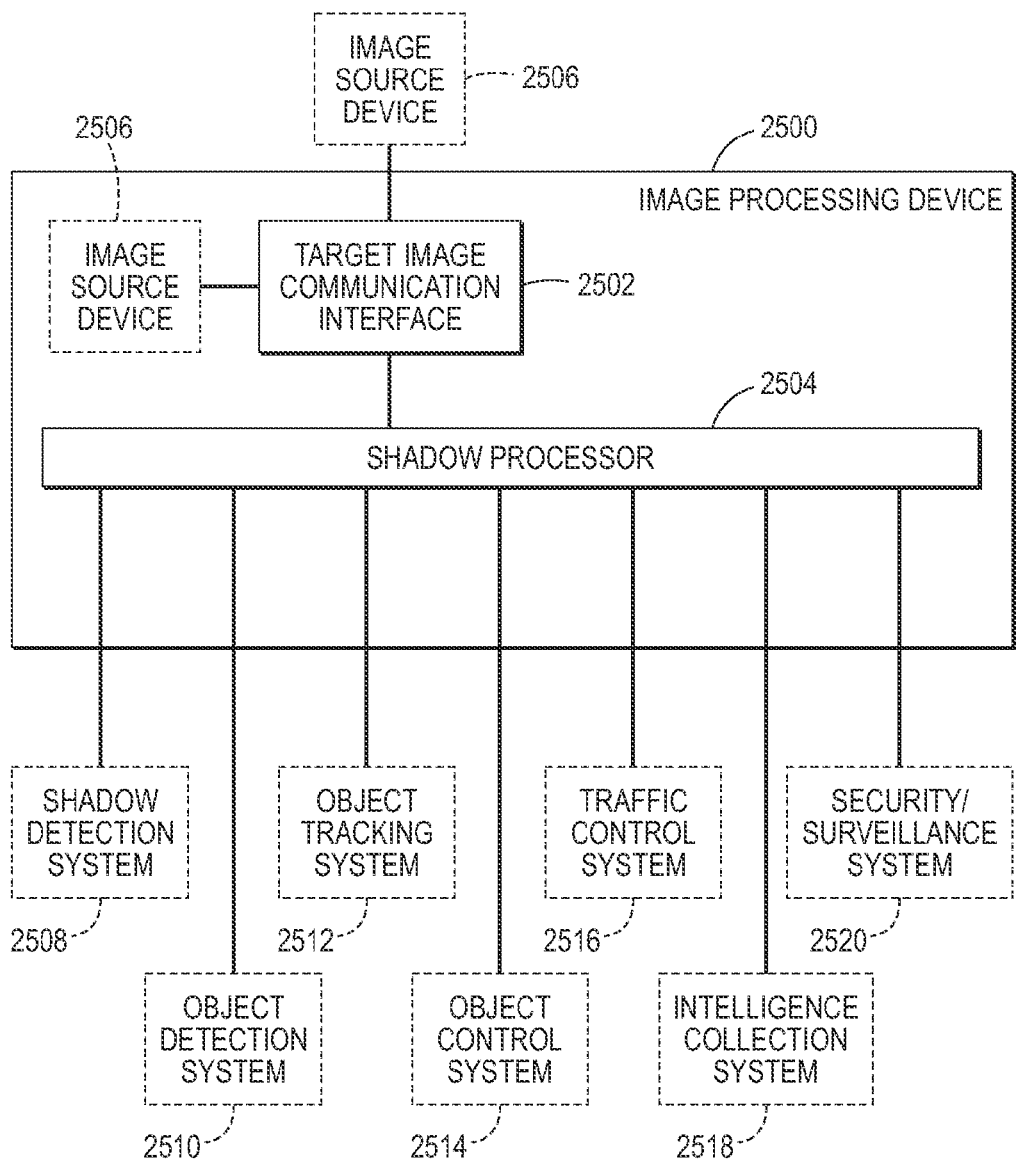
FIG. 25 is a block diagram of an exemplary embodiment of an image processing device for processing an image of a scene of interest.

With reference to FIG. 25, an exemplary embodiment of an image processing device 2500 for processing an image of a scene of interest includes a target image communication interface 2502 and a shadow processor 2504. The target image communication interface 2502 configured to receive an original target image of a scene of interest from an image source device 2506. The original target image exhibiting shadowing effects from ambient lighting conditions associated with the scene of interest when the original target image was captured. The original target image comprising a plurality of elements and representing an instantaneous state for the scene of interest. The shadow processor 2504 configured to pre-process the original target image using a modification identification algorithm to identify elements of the original target image to be modified. The shadow processor 2504 is configured to generate a copy mask with one or more mask regions representing the elements to be modified. The copy mask also includes one or more non-mask regions representing other elements of the original target image.

The copy mask is a useful article for further image processing, data processing, control processing, and/or various forms of decision making in conjunction with various types of systems and analytical tasks. For example, the copy mask may be provided to a shadow detection system 2508, an object detection system 2510, an object tracking system 2512, an object control system 2514, a traffic control system 2516, an intelligence collection system 2518, a security/surveillance system 2520, or similar types of systems in any suitable combination.

The image source device 2506 may be external or internal in relation to the image processing device 2500. Similarly, the image source device may be remote or local in relation to the image processing device 2500. The image source device 2506 may include a video camera, a digital camera, a storage device, a computer device, a communication device, or similar devices in any suitable combination.

In another embodiment of the image processing system 2500, the shadow processor 2504 is configured to process the copy mask using a filtering algorithm to perform morphological filtering, segmentation, refinement, or any other type of image filtering in any suitable combination. For example, the filtering algorithm may include any suitable combination of i) connecting mask regions within a predetermined distance from each other, ii) converting mask regions smaller than a predetermined area into non-mask regions, iii) converting non-mask regions smaller than a predetermined area into mask regions, iv) converting non-mask regions surrounded by mask regions into mask regions, v) smoothing boundaries of mask regions, vi) comparing mask regions to predetermined shapes, and vii) adjusting each mask region that matches a corresponding predetermined shape within a predetermined tolerance to conform the shape of the corresponding mask region to the matching predetermined shape.

Figure 26:
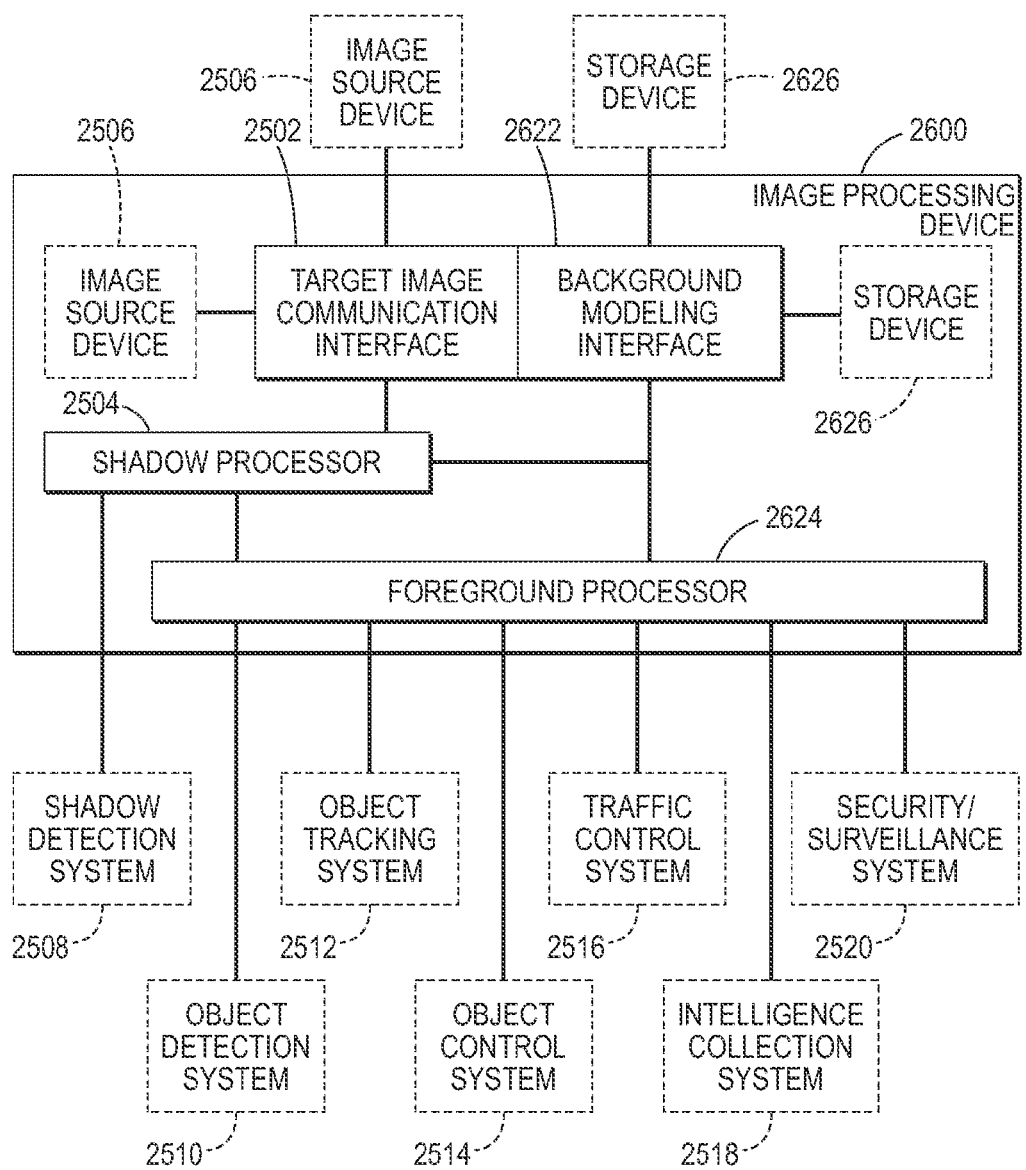
FIG. 26 is a block diagram of another exemplary embodiment of an image processing device for processing an image of a scene of interest.

With reference to FIG. 26, another exemplary embodiment of an image processing device 2600 for processing an image of a scene of interest includes the target image communication interface 2502 and shadow processor 2504 of FIG. 25 along with a background modeling interface 2622 and a foreground processor 2624. The background modeling interface 2622 configured to receive a baseline background model of the scene of interest from a storage device 2626. The baseline background model comprising a plurality of elements and representing a baseline state for the scene of interest. The foreground processor 2624 configured to process the original target image using a foreground detection algorithm in conjunction with the copy mask and the baseline background model to identify elements of the original target image that exhibit attributes of a foreground without shadows. The foreground processor 2624 is configured to generate a target foreground mask with one or more foreground regions representing the elements exhibiting foreground attributes without shadows. The target foreground mask also includes one or more non-foreground regions representing the elements to be modified and other elements of the original target image not exhibiting shadow or foreground attributes.

The target foreground mask is a useful article for further image processing, data processing, control processing, and/or various forms of decision making in conjunction with various types of systems and analytical tasks. For example, the target foreground mask may be provided to an object detection system 2510, an object tracking system 2512, an object control system 2514, a traffic control system 2516, an intelligence collection system 2518, a security/surveillance system 2520, or similar types of systems in any suitable combination.

The storage device 2626 may be external or internal in relation to the image processing device 2600. Similarly, the storage device may be remote or local in relation to the image processing device 2600. The storage device 2526 may include a local storage device, a remote storage device, a temporary storage device, a portable storage device, a removable storage device, or similar storage devices in any suitable combination.

In another embodiment of the image processing device 2600, the foreground processor 2624, in conjunction with the processing associated with the foreground detection algorithm, is configured to use the copy mask to identify elements of the original target image in the one or more mask regions and corresponding elements of the baseline background model. In this embodiment, the foreground processor 2624 is configured to modify the elements of the one or more mask regions in the original target image by replacing the elements of the one or more mask regions in the original target image with the corresponding elements of the baseline background model to form a modified target image. In the embodiment being described, the foreground processor 2624 Is configured to compare the modified target image to the baseline background model to identify the elements of the modified target image exhibiting foreground attributes without shadows. As described above, a modification identification test may be applied to RGB values of the target image to identify the elements to be modified in the original target image. In other embodiments of the image processing device 2600, the elements of the one or more mask regions in the original target image may be modified using a mathematical function, a statistical function, a logical function, or any suitable manipulative function in any suitable combination to form the modified target image.

In yet another embodiment of the image processing device 2600, the foreground processor 2624, in conjunction with the processing associated with the foreground detection algorithm, is configured to use the copy mask to identify elements of the original target image in the one or more mask regions and corresponding elements of the baseline background model. In this embodiment, the foreground processor 2624 is configured to modify the corresponding elements of the baseline background model by replacing the corresponding elements of the baseline background model with the elements of the one or more mask regions to form a modified background model. In the embodiment being described, the foreground processor 2624 is configured to compare the original target image to the modified background model to identify the elements of the original target image exhibiting foreground attributes without shadows. As described above, a modification identification test may be applied to RGB values of the target image to identify the elements to be modified in the background model. In other embodiments of the image processing device 2600, the elements of the one or more mask regions in the baseline background model image may be modified using a mathematical function, a statistical function, a logical function, or any suitable manipulative function in any suitable combination to form the modified background model.

In still another embodiment of the image processing device 2600, the foreground processor 2624 is configured to post-process the original target image using a foreground extraction algorithm in conjunction with the target foreground mask to perform i) segmenting the original target image into foreground and other regions, ii) identifying one or more foreground objects corresponding to the one or more foreground regions of the original target image, iii) removing the other regions from the original target image, or iv) any other type of foreground extraction technique in any suitable combination.

In still yet another embodiment of the image processing device 2600, the foreground processor 2624 is configured to process the target foreground mask using a filtering algorithm using a filtering algorithm to perform morphological filtering, segmentation, refinement, or any other type of image filtering in any suitable combination. For example, the filtering algorithm may include any suitable combination of i) connecting foreground regions within a predetermined distance from each other, ii) converting foreground regions smaller than a predetermined area into non-foreground regions, iii) converting non-foreground regions smaller than a predetermined area into foreground regions, iv) converting non-foreground regions surrounded by foreground regions into foreground regions, v) smoothing boundaries of foreground regions, vi) comparing foreground regions to predetermined shapes, and vi) adjusting each foreground region that matches a corresponding predetermined shape within a predetermined tolerance to conform the shape of the corresponding foreground region to the matching predetermined shape.

Figure 27:
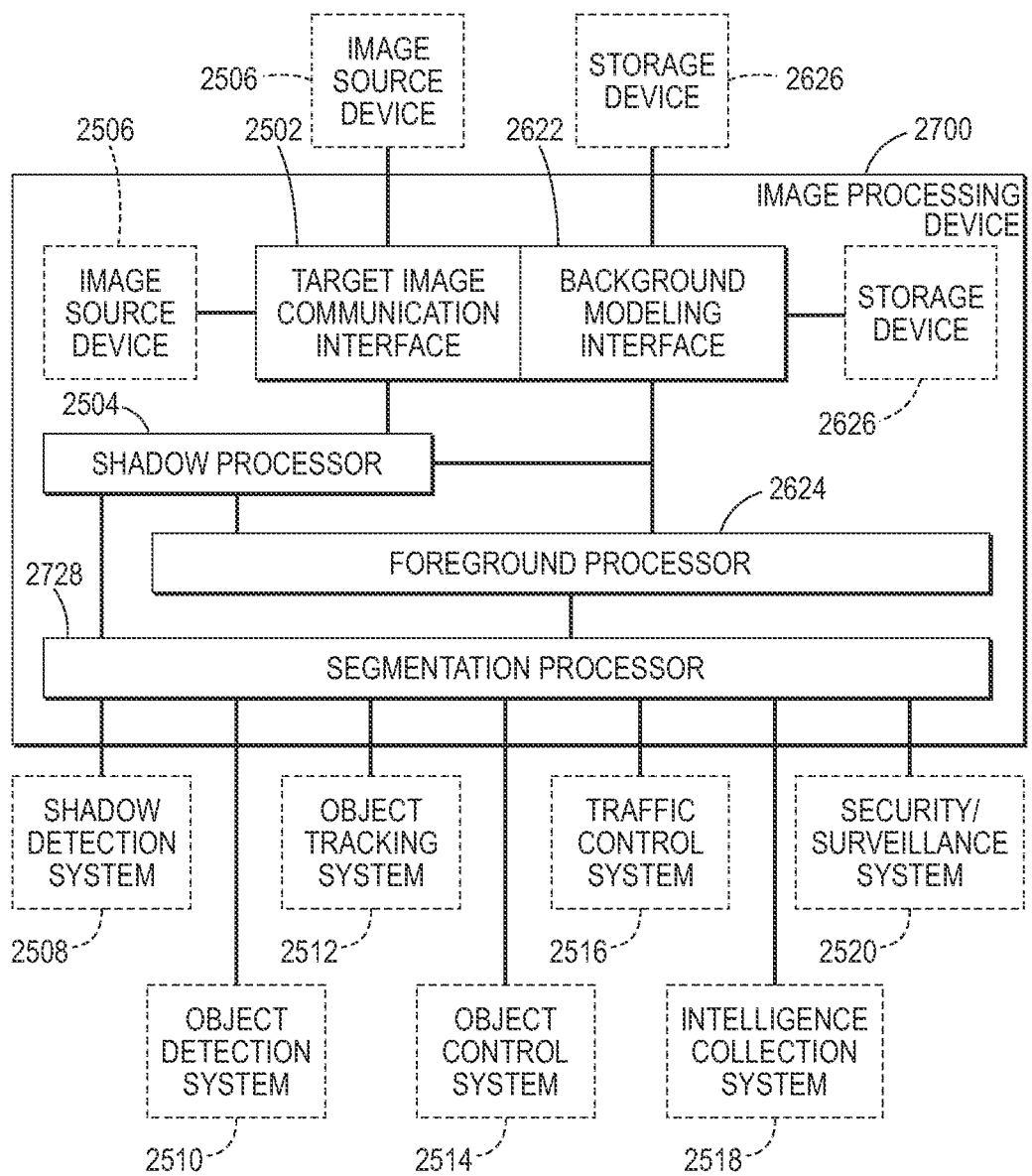
FIG. 27 is a block diagram of yet another exemplary embodiment of an image processing device for processing an image of a scene of interest.

With reference to FIG. 27, yet another exemplary embodiment of an image processing device 2700 for processing an image of a scene of interest includes the target image communication interface 2502 and shadow processor 2504 of FIG. 25 and the foreground processor 2624 of FIG. 26 along with a segmentation processor 2728. The segmentation processor 2728 configured to post-process the original target image using an image segmentation algorithm in conjunction with the copy mask and the target foreground mask to perform i) segmenting the original target image into shadow, foreground, and background regions, ii) identifying one or more shadow objects corresponding to the one or more mask regions of the original target image, iii) identifying one or more foreground objects corresponding to the one or more foreground regions of the original target image, iv) identifying a background portion corresponding to other regions of the original target image, or v) any other type of image segmentation technique in any suitable combination.

The various image regions, objects, and portions of the original target image are useful articles for further image processing, data processing, control processing, and/or various forms of decision making in conjunction with various types of systems and analytical tasks. For example, these outputs from the segmentation processor 2728 may be provided to a shadow detection system 2508, an object detection system 2510, an object tracking system 2512, an object control system 2514, a traffic control system 2516, an intelligence collection system 2518, a security/surveillance system 2520, or similar types of systems in any suitable combination.

With reference again to FIG. 26, still another exemplary embodiment of the image processing device 2600 for processing an image of a scene of interest includes the target image communication interface 2502 and shadow processor 2504 of FIG. 25 along with the background modeling interface 2622 and foreground processor 2624. In this embodiment, the shadow processor 2504 is configured to pre-process the original target image using a modification identification algorithm in conjunction with the copy mask and the baseline background model to form a modified target image of the scene of interest in which the elements of the one or more mask regions are modified based at least in part on the corresponding elements of the baseline background model. In the embodiment being described, the foreground processor 2624 is configured to process the modified target image using a foreground detection algorithm in conjunction with the baseline background model to identify elements of the modified target image that exhibit attributes of a foreground without shadows. The foreground processor 2624 is also configured to generate a target foreground mask with one or more foreground regions representing the elements exhibiting foreground attributes without shadows. The target foreground mask also includes one or more non-foreground regions representing other elements of the modified target image.

In a further embodiment of the image processing device 2600, the shadow processor 2504, in conjunction with the pre-processing associated with the modification identification algorithm, is configured to produce the copy mask to identify elements of the original target image in the one or more mask regions and corresponding elements of the baseline background model. In this embodiment, the shadow processor 2504 is configured to modify the elements of the one or more mask regions in the original target image by replacing the elements of the one or more mask regions in the original target image with the corresponding elements of the baseline background model to form the modified target image. In an even further embodiment, the foreground processor 2624, in conjunction with the processing associated with the foreground detection algorithm, is configured to compare the modified target image to the baseline background model to identify the elements of the modified target image exhibiting foreground attributes without shadows. As described above, a modification identification test may be applied to RGB values of the target image to identify the elements to be modified in the original target image.

With reference yet again to FIG. 26, still yet another exemplary embodiment of the image processing device 2600 for processing an image of a scene of interest includes the target image communication interface 2502 and shadow processor 2504 of FIG. 25 along with the background modeling interface 2622 and foreground processor 2624. In this embodiment, the shadow processor 2504 is configured to pre-process the baseline background model using a shadow overlay algorithm in conjunction with the one or more mask regions of the original target image to form a modified background model of the scene of interest in which the elements of the baseline background model that correspond to the elements of the one or more mask regions are modified based at least in part on the corresponding elements of the original target image. In the embodiment being described, the foreground processor 2624 is configured to process the original target image using a foreground detection algorithm in conjunction with the modified background model to identify elements of the original target image that exhibit attributes of a foreground without shadows. The foreground processor 2624 is also configured to generate a target foreground mask with one or more foreground regions representing the elements exhibiting foreground attributes without shadows and one or more non-foreground regions representing other elements of the original target image.

In a further embodiment, the shadow processor 2504, in conjunction with the pre-processing associated with the shadow overlay algorithm, is configured to use the copy mask to identify elements of the original target image in the one or more mask regions and corresponding elements of the baseline background model. In this embodiment, the shadow processor 2504 is also configured to modify the corresponding elements of the baseline background model by replacing the corresponding elements of the baseline background model with the elements of the one or more mask regions to form the modified background model. In an even further embodiment, the foreground processor 2624, in conjunction with the processing associated with the foreground detection algorithm, is configured to compare the original target image to the modified background model to identify the elements of the original target image exhibiting foreground attributes without shadows. As described above, a modification identification test may be applied to RGB values of the target image to identify the elements to be modified in the background model.

Figure 28:
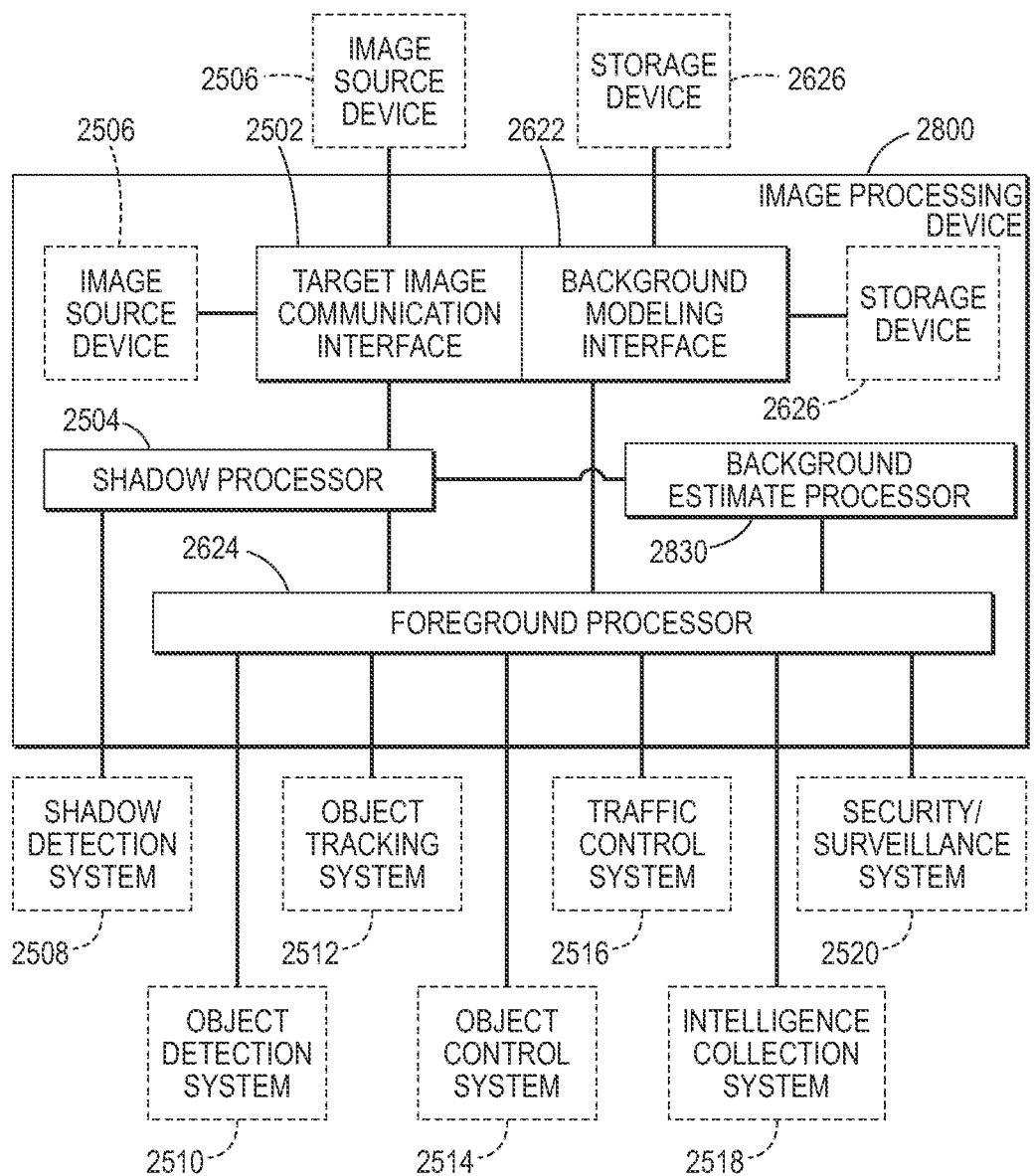
FIG. 28 is a block diagram of still another exemplary embodiment of an image processing device for processing an image of a scene of interest.

With reference to FIG. 28, still another exemplary embodiment of an image processing device 2800 for processing an image of a scene of interest includes the target image communication interface 2502 and shadow processor 2504 of FIG. 25. In this embodiment, the shadow processor 2504, in conjunction with the pre-processing associated with the modification identification algorithm, is configured to form a destination matrix with a plurality of matrix elements corresponding to the plurality of elements of the original target image. Each matrix element defining the corresponding element of the original target image by a row, a column, and a color represented by three color component values. In the embodiment being described, the shadow processor 2504 is also configured to identify matrix elements with color component values within a predetermined range as representing elements of the original target image to be modified. The shadow processor 2504 is also configured to define the one or more mask regions of the original target image based at least in part on the identified matrix elements.

In another embodiment, the image processing device 2800 also includes the background modeling interface 2622 and foreground processor 2624 of FIG. 26 along with a background estimate processor 2830. The background estimate processor 2624 configured to form a source matrix with a plurality of matrix elements corresponding to the plurality of elements of the baseline background model. Each matrix element defining the corresponding element of the baseline background model by a row, a column, and a color represented by three color component values. In this embodiment, the foreground processor 2624 is configured to replace the three color component values of the matrix elements of the destination matrix associated with the one or more mask regions of the original target image with the three color component values of the corresponding matrix elements of the source matrix to form a modified destination matrix and a corresponding modified target image. The foreground processor 2624 is also configured to compare the modified target image to the baseline background model to identify the elements of the modified target image exhibiting foreground attributes without shadows. As described above, a modification identification test may be applied to RGB values of the target image to identify the elements to be modified in the original target image.

In yet another embodiment of the image processing device 2800, the shadow processor 2504, in conjunction with the pre-processing associated with the modification identification algorithm, is configured to bound the identifying of matrix elements with color component values within the predetermined range to filter out matrix elements with color component values representing white and black, matrix elements with color component values approaching white within a first predetermined threshold, and matrix elements with color component values approaching black within a second predetermined threshold.

With reference again to FIG. 28, still yet another exemplary embodiment of the image processing device 2800 for processing an image of a scene of interest includes the target image communication interface 2502 and shadow processor 2504 of FIG. 25, the background modeling interface 2622 and foreground processor 2624 of FIG. 26, and the background estimate processor 2830. In this embodiment, the background estimate processor 2830 is configured to align the baseline background model to a view plane compatible with an eye-point associated with the original target image. In the embodiment being described, the background estimate processor 2830 is configured to scale the elements of the baseline background model to a resolution compatible with the original target image.

With reference to FIGS. 17-28, various exemplary embodiments of non-transitory computer-readable medium storing program instructions that, when executed by one or more processors, cause a corresponding image processing device to perform a method for processing an image of a scene of interest. For example, various embodiments of the image processing device 2500, 2600, 2700, 2800 are described above with reference to FIGS. 25-28. Various embodiments of the method for processing an image of a scene of interest 1700, 1800, 1900, 2100, 2200, 2300, 2400, for example, are described above with reference to FIGS. 17-24.

In addition to the disclosure above, various exemplary embodiments of non-transitory computer-readable medium are disclosed herein. The various embodiments of non-transitory computer-readable medium store program instructions that, when executed by one or more processors, may cause an image processing device to perform various combinations of functions associated with the various embodiments of the processes 1700, 1800, 1900, 2100, 2200, 2300, 2400 for processing an image of a scene of interest described above with reference to FIGS. 17-23. For example, the various embodiments of the image processing device 2500, 2600, 2700, 2800 described above with reference to FIGS. 25-28 may include the one or more processors and may perform the various combination of functions associated with processing an image of a scene of interest based on the program instructions stored on corresponding embodiments of the non-transitory computer readable medium. The one or more processors, for example, include the shadow processor 2504, foreground processor 2624, segmentation processor 2728, and background estimate processor 2830.

In other words, the program instructions of the various exemplary embodiments of non-transitory computer-readable medium are defined by any suitable combination of the processes 1700, 1800, 1900, 2100, 2200, 2300, 2400 described above with reference to FIGS. 17-23. Similarly, the one or more processors and the image processing device associated with the various exemplary embodiments of non-transitory computer-readable medium are defined by any suitable combination of the image processing devices 2500, 2600, 2700, 2800 described above with reference to FIGS. 25-28.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for processing an image of a scene of interest, comprising:
receiving an original target image of a scene of interest at an image processing device from an image source device, the original target image exhibiting shadowing effects associated with the scene of interest when the original target image was captured, the original target image comprising a plurality of elements and representing an instantaneous state for the scene of interest;
pre-processing the original target image using a modification identification algorithm to identify elements of the original target image to be modified;
generating a copy mask with one or more mask regions representing the elements to be modified and one or more non-mask regions representing other elements of the original target image;
receiving a baseline background model of the scene of interest at the image processing device from a storage device, the baseline background model comprising a plurality of elements and representing a baseline state for the scene of interest;
processing the original target image in conjunction with the copy mask and the baseline background model; and
using a foreground detection algorithm to identify elements of the original target image that exhibit attributes of a foreground without shadows.

2. The method of claim 1, further comprising:
generating a target foreground mask with one or more foreground regions representing the elements exhibiting foreground attributes without shadows.

3. The method of claim 2, the using associated with the foreground detection algorithm comprising:
using the copy mask to identify elements of the original target image in the one or more mask regions and corresponding elements of the baseline background model;
modifying the elements of the one or more mask regions in the original target image by replacing the elements of the one or more mask regions in the original target image with the corresponding elements of the baseline background model to form a modified target image; and
comparing the modified target image to the baseline background model to identify the elements of the modified target image exhibiting foreground attributes without shadows.

4. The method of claim 2, the using associated with the foreground detection algorithm comprising:
using the copy mask to identify elements of the original target image in the one or more mask regions and corresponding elements of the baseline background model;
modifying the corresponding elements of the baseline background model by replacing the corresponding elements of the baseline background model with the elements of the one or more mask regions to form a modified background model; and
comparing the original target image to the modified background model to identify the elements of the original target image exhibiting foreground attributes without shadows.

5. The method of claim 2, further comprising:
post-processing the original target image in conjunction with the target foreground mask to perform at least one of segmenting the original target image into foreground and other regions, identifying one or more foreground objects corresponding to the one or more foreground regions of the original target image, and removing the other regions from the original target image.

6. The method of claim 2, further comprising:
post-processing the original target image in conjunction with the copy mask and the target foreground mask to perform at least one of:
segmenting the original target image into shadow, foreground, and background regions;

identifying one or more shadow objects corresponding to the one or more mask regions of the original target image;

identifying one or more foreground objects corresponding to the one or more foreground regions of the original target image; and identifying a background portion corresponding to other regions of the original target image.

7. The method of claim 1, further comprising:

pre-processing the original target image using a modification identification algorithm in conjunction with the copy mask and the baseline background model to form a modified target image of the scene of interest in which the elements of the one or more mask regions are modified based at least in part on the corresponding elements of the baseline background model;

processing the modified target image using the foreground detection algorithm in conjunction with the baseline background model to identify elements of the modified target image that exhibit attributes of the foreground without shadows; and generating a target foreground mask with one or more foreground regions representing the elements of the modified target image exhibiting foreground attributes without shadows.

8. The method of claim 7, the pre-processing associated with the modification identification algorithm comprising:

using the copy mask to identify elements of the original target image in the one or more mask regions and corresponding elements of the baseline background model; and modifying the elements of the one or more mask regions in the original target image by replacing the elements of the one or more mask regions in the original target image with the corresponding elements of the baseline background model to form the modified target image.

9. The method of claim 1, further comprising:

pre-processing the baseline background model using a shadow overlay algorithm in conjunction with the one or more mask regions of the copy mask to form a modified background model of the scene of interest in which the elements of the baseline background model that correspond to the elements of the one or more mask regions are modified based at least in part on the corresponding elements of the original target image;

processing the original target image using the foreground detection algorithm in conjunction with the modified background model to identify the elements of the original target image that exhibit attributes of the foreground without shadows; and generating a target foreground mask with one or more foreground regions representing the elements exhibiting foreground attributes without shadows.

10. The method of claim 9, the pre-processing associated with the shadow overlay algorithm comprising:

using the copy mask to identify elements of the original target image in the one or more mask regions and corresponding elements of the baseline background model; and modifying the corresponding elements of the baseline background model by replacing the corresponding elements of the baseline background model with the elements of the one or more mask regions to form the modified background model.

11. The method of claim 1, the pre-processing associated with the modification identification algorithm comprising:

forming a destination matrix with a plurality of matrix elements corresponding to the plurality of elements of the original target image, each matrix element defining the corresponding element of the original target image by a row, a column, and a color represented by three color component values;

identifying matrix elements with color component values within a predetermined range as representing elements of the original target image to be modified; and defining the one or more mask regions of the original target image based at least in part on the identified matrix elements.

12. The method of claim 11, further comprising:

forming a source matrix with a plurality of matrix elements corresponding to the plurality of elements of the baseline background model, each matrix element defining the corresponding element of the baseline background model by a row, a column, and a color represented by three color component values;

replacing the color component values of the matrix elements of the destination matrix associated with the one or more mask regions of the original target image with the three color component values of the corresponding matrix elements of the source matrix to form a modified destination matrix and a corresponding modified target image; and comparing the modified target image to the baseline background model to identify the elements of the modified target image exhibiting foreground attributes without shadows.

13. The method of claim 11 wherein the identifying of matrix elements with color component values within the predetermined range filters out matrix elements with color component values representing white and black, matrix elements with color component values approaching white within a first predetermined threshold, and matrix elements with color component values approaching black within a second predetermined threshold.

14. An apparatus for processing an image of a scene of interest, comprising:

a target image communication interface configured to receive an original target image of a scene of interest from an image source device, the original target image exhibiting shadowing effects associated with the scene of interest when the original target image was captured, the original target image comprising a plurality of elements and representing an instantaneous state for the scene of interest;

a shadow processor configured to pre-process the original target image using a modification identification algorithm to identify elements of the original target image to be modified, wherein the shadow processor is configured to generate a copy mask with one or more mask regions representing the elements to be modified and one or more non-mask regions representing other elements of the original target image;

a background modeling interface configured to either receive a baseline background model of the scene of interest from a storage device, the baseline background model comprising a plurality of elements and representing a baseline state for the scene of interest; and a foreground processor configured to process the original target image in conjunction with the copy mask and the baseline background model, wherein the foreground processor is configured to use a foreground detection algorithm to identify elements of the original target image that exhibit attributes of a foreground without shadows.

15. The apparatus of claim 14 wherein the foreground processor is configured to generate a target foreground mask with one or more foreground regions representing the elements exhibiting foreground attributes without shadows.

16. The apparatus of claim 15, further comprising:
a segmentation processor configured to post-process the original target image in conjunction with the copy mask and the target foreground mask to perform at least one of:
segmenting the original target image into shadow, foreground, and background regions;
identifying one or more shadow objects corresponding to the one or more mask regions of the original target image;
identifying one or more foreground objects corresponding to the one or more foreground regions of the original target image; and
identifying a background portion corresponding to other regions of the original target image.

17. The apparatus of claim 14 wherein the shadow processor is configured to pre-process the original target image using a modification identification algorithm in conjunction with the copy mask and the baseline background model to form a modified target image of the scene of interest in which the elements of the one or more mask regions are modified based at least in part on the corresponding elements of the baseline background model;
wherein the foreground processor is configured to process the modified target image using the foreground detection algorithm in conjunction with the baseline background model to identify elements of the modified target image that exhibit attributes of the foreground without shadows;
wherein the foreground processor is also configured to generate a target foreground mask with one or more foreground regions representing the elements of the modified target image exhibiting foreground attributes without shadows.

18. The apparatus of claim 14 wherein the shadow processor is configured to pre-process the baseline background model using a shadow overlay algorithm in conjunction with the one or more mask regions of the copy mask to form a modified background model of the scene of interest in which the elements of the baseline background model that correspond to the elements of the one or more mask regions are modified based at least in part on the corresponding elements of the original target image;
wherein the foreground processor is configured to process the original target image using the foreground detection algorithm in conjunction with the modified background model to identify the elements of the original target image that exhibit attributes of the foreground without shadows;
wherein the foreground processor is also configured to generate a target foreground mask with one or more foreground regions representing the elements exhibiting foreground attributes without shadows.

19. The apparatus of claim 14 wherein the shadow processor, in conjunction with the pre-processing associated with the modification identification algorithm, is configured to:
form a destination matrix with a plurality of matrix elements corresponding to the plurality of elements of the original target image, each matrix element defining the corresponding element of the original target image by a row, a column, and a color represented by three color component values;
identify matrix elements with color component values within a predetermined range as representing elements of the original target image to be modified; and
define the one or more mask regions of the original target image based at least in part on the identified matrix elements;
the apparatus, further comprising:
a background estimate processor configured to form a source matrix with a plurality of matrix elements corresponding to the plurality of elements of the baseline background model, each matrix element defining the corresponding element of the baseline background model by a row, a column, and a color represented by three color component values;
wherein the foreground processor is configured to replace the color component values of the matrix elements of the destination matrix associated with the one or more mask regions of the original target image with the three color component values of the corresponding matrix elements of the source matrix to form a modified destination matrix and a corresponding modified target image;
wherein the foreground processor is configured to compare the modified target image to the baseline background model to identify the elements of the modified target image exhibiting foreground attributes without shadows.

20. A non-transitory computer-readable medium storing program instructions that, when executed by one or more processors, cause a corresponding image processing device to perform a method for processing an image of a scene of interest, the method comprising:
receiving an original target image of a scene of interest at an image processing device from an image source device, the original target image exhibiting shadowing effects associated with the scene of interest when the original target image was captured, the original target image comprising a plurality of elements and representing an instantaneous state for the scene of interest;
pre-processing the original target image using a modification identification algorithm to identify elements of the original target image to be modified;
generating a copy mask with one or more mask regions representing the elements to be modified and one or more non-mask regions representing other elements of the original target image;
receiving a baseline background model of the scene of interest at the image processing device from a storage device, the baseline background model comprising a plurality of elements and representing a baseline state for the scene of interest;
processing the original target image in conjunction with the copy mask and the baseline background model;
using a foreground detection algorithm to identify elements of the original target image that exhibit attributes of a foreground without shadows; and
generating a target foreground mask with one or more foreground regions representing the elements exhibiting foreground attributes without shadows.

* * * * *